US008245139B2

(12) United States Patent
Michelman

(10) Patent No.: US 8,245,139 B2
(45) Date of Patent: *Aug. 14, 2012

(54) MODELLING RELATIONSHIPS WITHIN AN ON-LINE CONNECTIVITY UNIVERSE

(75) Inventor: Eric H. Michelman, Bellevue, WA (US)

(73) Assignee: Cascade Basic Research Corp., Seattle, WA (US)

( * ) Notice: Subject to any disclaimer, the term of this patent is extended or adjusted under 35 U.S.C. 154(b) by 207 days.

This patent is subject to a terminal disclaimer.

(21) Appl. No.: 12/661,104

(22) Filed: Mar. 9, 2010

(65) Prior Publication Data

US 2011/0047466 A1 Feb. 24, 2011

Related U.S. Application Data

(63) Continuation of application No. 11/213,447, filed on Aug. 26, 2005, now Pat. No. 7,788,587, which is a continuation-in-part of application No. 11/109,488, filed on Apr. 18, 2005, now abandoned.

(60) Provisional application No. 60/562,848, filed on Apr. 16, 2004, provisional application No. 60/566,507, filed on Apr. 29, 2004, provisional application No. 60/630,764, filed on Nov. 24, 2004.

(51) Int. Cl.
*G06F 15/177* (2006.01)

(52) U.S. Cl. ......... 715/734; 715/738; 715/739; 715/737

(58) Field of Classification Search .................. 715/734, 715/737, 738, 739
See application file for complete search history.

(56) References Cited

U.S. PATENT DOCUMENTS

| | | | |
|---|---|---|---|
| 5,561,753 | A | 10/1996 | Coulombe et al. |
| 5,999,179 | A | 12/1999 | Kekic et al. |
| 6,628,304 | B2 | 9/2003 | Mitchell et al. |
| 7,120,874 | B2 | 10/2006 | Shah et al. |
| 7,367,028 | B2 | 4/2008 | Kodosky et al. |
| 7,788,587 | B2 | 8/2010 | Michelman |

(Continued)

FOREIGN PATENT DOCUMENTS

WO 0167759 A2 9/2001

OTHER PUBLICATIONS

Windows XP Pro, Service Pack 2, Copyright (c) 1981-2001, Microsoft Corporation, pp. 1-3.
Windows XP Pro, Service Pack 2, Copyright (c) 1981-2001, Microsoft Corporation, 4 pages.

(Continued)

*Primary Examiner* — Andrey Belousov
(74) *Attorney, Agent, or Firm* — Lowe Graham Jones PLLC

(57) ABSTRACT

Enhanced presentation techniques for modeling a connectivity universe associated with a particular user or device are provided. Example embodiments provide a WorldView Display System (a "WVDS"), which automatically organizes a user's online relationships with entities, such as devices, data collections, services, and people, and provides a user interface for accessing and interacting with these entities. The WVDS automatically determines the universe of objects that the user has relationships with, automatically groups objects having similar measures of access proximity, displays a multi-dimensional representation of these groups of objects on a display device, and provides a uniform user interface for initiating an interaction with any represented object. This abstract is provided to comply with rules requiring an abstract, and it is submitted with the intention that it will not be used to interpret or limit the scope or meaning of the claims.

41 Claims, 33 Drawing Sheets
(26 of 33 Drawing Sheet(s) Filed in Color)

U.S. PATENT DOCUMENTS

| | | |
|---|---|---|
| 2002/0026474 A1 | 2/2002 | Wang et al. |
| 2003/0158855 A1 | 8/2003 | Farnham et al. |
| 2004/0179033 A1 | 9/2004 | Yu et al. |

OTHER PUBLICATIONS

Beier, "Virtual Reality: A Short Introduction," University of Michigan Virtual Reality Laboratory at the College of Engineering, pp. 1-6, Feb. 10, 2004.

MODELLING RELATIONSHIPS WITHIN AN ON-LINE CONNECTIVITY UNIVERSE

TECHNICAL FIELD

The present description relates to enhanced presentations and management of online information and, in particular, to techniques for modeling a user's connectivity relationships with network accessible devices, services, people, and data.

BACKGROUND

On-line communications have become an increasingly important aspect of people's lives. These communications can take many forms, including explicit person-to-person communication such as email, instant messaging, or other forms of sending electronic messages; communication with on-line services such as web sites, email servers, and other Internet Service Provider ("ISP") services; and communication with local and remote devices, such as printers, scanners, or fax machines on a home network or, for example, on-line phones, cameras, PDAs, and other portable computers or devices.

Managing and communicating with the morass of types of devices and connections has become difficult and not very "user-friendly" to a casual, or not necessarily technically savvy, user. Interfaces to devices are inconsistent, and the requirements for accessing services are not uniform or even well-known. In a typical conventional computing environment, a user conducts such communications by locating a user interface ("UI") associated with the desired target or task, figuring out how to use it, and then invoking it to conduct the desired communication. For example, to set up access to or to change default properties associated with access to a particular printer, a user is forced to find and invoke a "setup" tool (e.g., a printer configuration tool) from a user interface presented by the underlying operating system, for example the Microsoft Windows™ "desktop." The setup tool displays a series of dialog boxes or other windows, whose user interface controls are dedicated to interacting with the target printer. The user is then forced to find the correct control, dialog, or other UI component to perform a desired operation. If the user can locate the appropriate user interface, recognize it as the needed one, and find the appropriate specific component to invoke, then the user can perform the desired task. However, for many users, management tools such as this one are impenetrable black boxes with limited options for control and little instruction.

One reason for these difficulties is that the current metaphor for operating system user interfaces for personal computers is typically an "office" desktop or derivative thereof. The desktop metaphor was developed in the 1970's and was originally targeted to the office automation market. However, the office automation environment for which these user interfaces were designed no longer represents a reasonable facsimile of or metaphor for how many people today incorporate computers in everyday life.

The patent or patent application file contains at least one drawing executed in color. Copies of this patent or patent application publication with color drawings will be provided by the Office upon request and payment of the necessary fee.

BRIEF DESCRIPTION OF THE DRAWINGS

For example.

DETAILED DESCRIPTION

Figure 1:
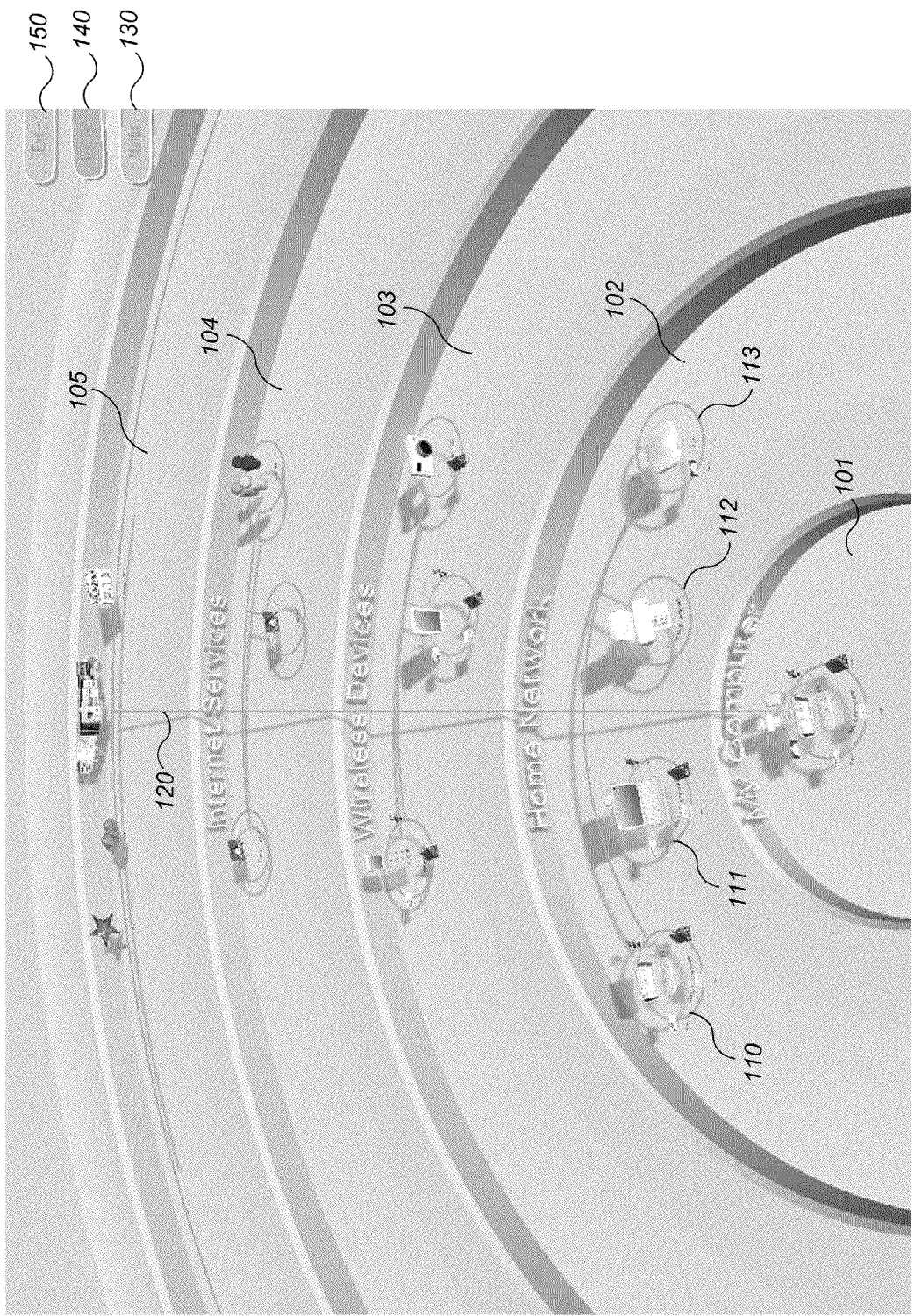
FIG. 1 is an example screen display of an example connectivity universe presented by an example WorldView Display System.

Embodiments described herein provide enhanced computer- and network-based methods, systems, computer-readable instructions, and techniques for modeling and interacting with a user's universe of on-line relationships, including, for example, people, devices, content, services, and other entities that are connected to the user, directly or indirectly, via one or more networks. Each entity is associated with the user through an object, such as a physical or logical device, data collection, or service that is connected to the network. The objects associated with the entities to which a user has or potentially can have relationships are referred to collectively as a user's connectivity universe. Thus, for ease of description, a user's relationships with a set of entities are considered synonymous with the user's relationships with the objects that correspond to such entities, and the words "entity" and "object" are used interchangeably unless noted otherwise.

Example embodiments provide a WorldView Display System ("WVDS"), which automatically organizes a user's online relationships with such entities according to similarities of "access proximity" and provides a user interface for accessing and interacting with these entities and their corresponding objects. Access proximity is an assessment of the "closeness" of the relationship between an object, such as a device, a collection of data, a service, or other object that corresponds to an entity, and the user, as evaluated according to (or measured by) any one of a number of characteristics. Example characteristics include:

- physical proximity (e.g., location of the object);
- prior access history (e.g., access of the object by the user within a specified period of time);
- extent to which the object is under the user's control (e.g., access rights to the object can be set by the user for the user and for others; object is hosted on a device controlled by the user as opposed to remotely hosted);
- type of device (e.g., a PC, server, PDA, media-oriented device, such as a camera or phone, etc.);
- operational characteristics (e.g., object is a public service such as "Hotmail" or "AOL Instant Messenger," a controlled-access device such as a personal computer, a physical, or a virtual device such as a "Buddy Room" that contains remotely hosted content);
- portion of the object that corresponds to the user (e.g., percentage of a device occupied by the user's content);
- network connectivity characteristics (e.g., type of object's connection to a network such as a wireless connection, object resides on a network dedicated to the user or resides on a network dedicated to a controlled-access group that includes the user, or object resides on a public shared network such as the Internet).

An assessment of access proximity may be determined, for example, as numeric values, ranges, the presence or absence or likeness of certain characteristics, or any other measurements, evaluations, or heuristics that provide a classification scheme (i.e., a "taxonomy" of access proximity). Also, other types of characteristics may be used to assess access proximity and that combinations of characteristics can also be used.

The WVDS automatically determines the universe of objects that the user has relationships with, automatically groups objects having similar assessments of access proximity, displays a representation of these groups of objects on a display device, and provides a uniform user interface for initiating an interaction with any displayed (represented) object. For example, the user can activate an object and "zoom in" to see what data content it contains; invoke a native user interface of the object (e.g., "open" the object); set up a data sharing relationship between data content; configure access permissions; set attributes for what is displayed in conjunction with an object's representation and what input is forwarded to a represented device; etc. The user invokes these operations in a uniform way, that does not rely upon knowledge specific to the object.

Thus, in one aspect the WVDS provides an operating environment that models a connectivity universe from a user's point of view and that provides a metaphor for interacting with objects of potential interest to the user that is on-line centric as opposed to desktop centric. In addition, WVDS orients the user to focus on the media and media types that are present on devices in the user's connectivity universe as opposed to the configuration settings of particular devices. In another aspect, the WVDS provides a navigational model for viewing and interacting with a three-dimensional representation of the user's connectivity universe using graphics and rendering techniques that give an impression of moving (e.g., "flying") through a virtual world (a 3-D universe) to locate, view, activate, and open objects. In yet another aspect, the WVDS provides a graphical user interface for easily setting up data sharing relationships between any two objects in a uniform manner. Other aspects will be apparent and can be gleaned from the description that follows.

FIG. 1 is an example screen display of an example connectivity universe presented by an example WorldView Display System. FIG. 1 shows five different groupings of objects based upon access proximity classifications, including: My Computer 101; a Home Network group 102, a Wireless Devices group 103; an Internet Services group 104; and The Web group 105 from a particular user's perspective. Each group is related to the user through at least one network, in this case a wide area network 120 (a "WAN," e.g., the Internet).

In one embodiment, the WVDS groups objects and displays each group as a "proximity band" in the user's connectivity universe. Each proximity band displays a set of objects that are related to each other, from the user's perspective, in that they have similar characteristics as measured by access proximity. That is, each proximity band corresponds to a different class of access proximity, as assessed by whatever characteristic(s) is (are) currently configured for evaluating access proximity. Each proximity band displays representations of the objects that belong to (are grouped in) that band and a representation of the data content that is present on each such object.

For example, in the example embodiment illustrated in FIG. 1, the WVDS represents each of groups 101-105 as a proximity band in the user's connectivity universe. Each proximity band displays a representation of the objects that are grouped in that proximity band (have similar access proximity). For example, the proximity band labeled "Home Network" 102 displays a representation of four objects (physical devices) 110-113 with which the user has a relationship through the user's home local area network ("LAN"). These devices include a computer system 110 representing the "Kids' computer;" a computer system 111 representing "Sue's computer;" and a photo printer 112 and a personal video recorder 113 that are shared resources connected to the user's home LAN. Note that each device is represented by the WVDS as a model of the device surrounded by a graphical indicator such as a "device ring," which displays a "hint" as to the type of content contained or managed by the device. The representation of the device, (i.e., the device "model") may include, for example, an icon, character, symbol, label, drawing, or any other representation that is indicative of the device. Device rings are described further below with respect to FIG.

2. In the illustrated scenario, physical proximity, device type, prior access history, extent of user control, operational characteristics, and network connectivity characteristics have been used to measure similarities of access proximity. The groups of objects (hence the proximity bands) are automatically determined by the WVDS relative to the user based upon similarities of access proximity characteristics and, in the view of the connectivity universe illustrated in FIG. 1, are displayed relative to a designated (host) device associated with the user, such as My Computer 101. If a different user initiates a session with the WVDS using computer system 101, if the same user initiates a session but designates a different host device or different access proximity characteristics, or if the user designates a different view that may not include displaying or designating a host device or certain proximity bands, then the layout displayed by the WVDS will be accordingly adjusted.

In one embodiment, each device representation is displayed along with a device ring that simultaneously shows the contents (as data collections) associated with that particular device. Other embodiments may incorporate different types of graphical indicators, which may partially surround or totally surround a device representation. The device representation may indicate a physical or virtual device, such as a virtual "device" that represents a means to get access to a relationship such as another user's data collection. Other embodiments may require the user to navigate to a closer "level of perspective" (for example, by "zooming in" to the object) before displaying an associated device ring. In addition, some embodiments may permit a user to configure whether a device ring is displayed on a per device level, per device type, per proximity band, entire WVDS, etc., or in any combination.

Figure 2:
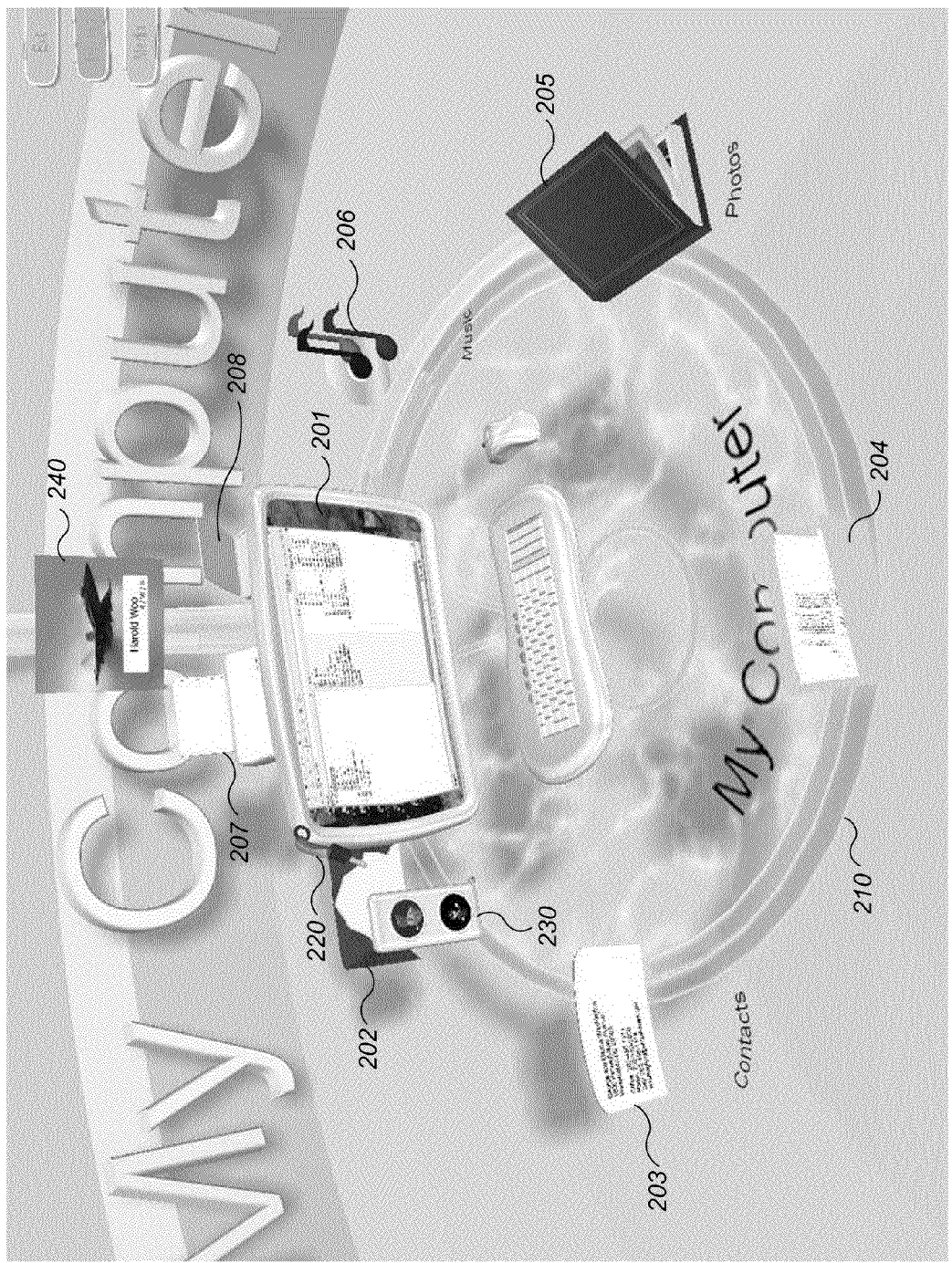
FIG. 2 is an example screen display of a device ring displayed by an example WorldView Display System.

FIG. 2 is an example screen display of a device ring displayed by an example WorldView Display System. (It also shows navigation by zooming in closer to an object.) The represented computer system 201, labeled "My Computer," is shown in the center of a ring formed by at least one cable 210. (Multiple cables are used to indicate data sharing relationships and are described further below with respect to FIG. 24.) The printer and scanner devices attached to computer system 201 are shown as devices 207 and 208, respectively. Each data collection present on the computer system 201 is represented along the ring as data collections 202-206. For example, video data is represented as data collection 202, contact data is represented as data collection 203, files are represented as data collection 204, photos are represented as data collection 205, and music data is represented as data collection 206.

Each device (or other displayed object) is considered active or inactive. The WVDS typically allows only one object (device or data collection) to be active at a time to control clutter and confusion; however such settings are configurable. In some embodiments, the device needs to be made active before its device ring is displayed. In other embodiments, a device ring is displayed if appropriate to the device type, for example, without regard to whether a device is active/inactive. In a typical WVDS, the user activates a device (or data collection) by selecting the object using an input device, such as, for example, clicking on the object representation with a mouse cursor. The user can also select the object by "hovering" an input device cursor over the object representation. Once an object is active, a user interface is displayed, such as palette 230, to allow the user to change, for example, WVDS attributes, device related attributes or access privileges associated with the object. The user can also zoom in or out, thereby potentially changing how much detail of the object is shown and/or how large or small the components of the object appear, or can invoke a native user interface associated with the device (e.g., "open" the object). An object's representation is typically changed to indicate that the device is active.

Also, in some embodiments, the WVDS may recognize that a device is not currently on-line (accessible). In such a case, the WVDS may display an indication (not shown), such as a dashed line, or other demarcated indicator, connecting the device ring associated with the device representation to the network cabling displayed in the associated proximity band. In other embodiments, portions of a representation of an on-line device are omitted or changed when the device is off-line, such as graying out the device ring or leaving out a connector cable from a device ring to the network, etc.

Note that, in the illustrated embodiment shown in FIG. 1, there is a single data collection represented for each type of data—other embodiments may organize the data differently. For example, when a device has multiple disk drives or types of internal or external storage, the WVDS may represent each drive's files as separate data collections or may represent all the files as a single collection which contains sub-collections associated with each drive. As another example, when a device has multiple groups of music (or other media) content, the WVDS may represent each group of music content as a separate music data collection (each potentially having sub-collections) on the device or as a single music collection which contains a sub-collection for each group of music (each potentially having sub-collections). In any case, any hierarchical organization of content present on devices is preserved through the notion of sub-collections, which are data collection groupings within a particular collection. A sub-collection also may correspond, for example, to a playlist, an album, a collection of videos, etc. For example, the music data collection 206 may have associated with it some number of sub-collections. When a data collection having sub-collections is viewed at a level of perspective ("LP") that presents its contents, then, in one embodiment, the WVDS displays each data sub-collection on a data collection ring of its parent collection.

Figure 3:
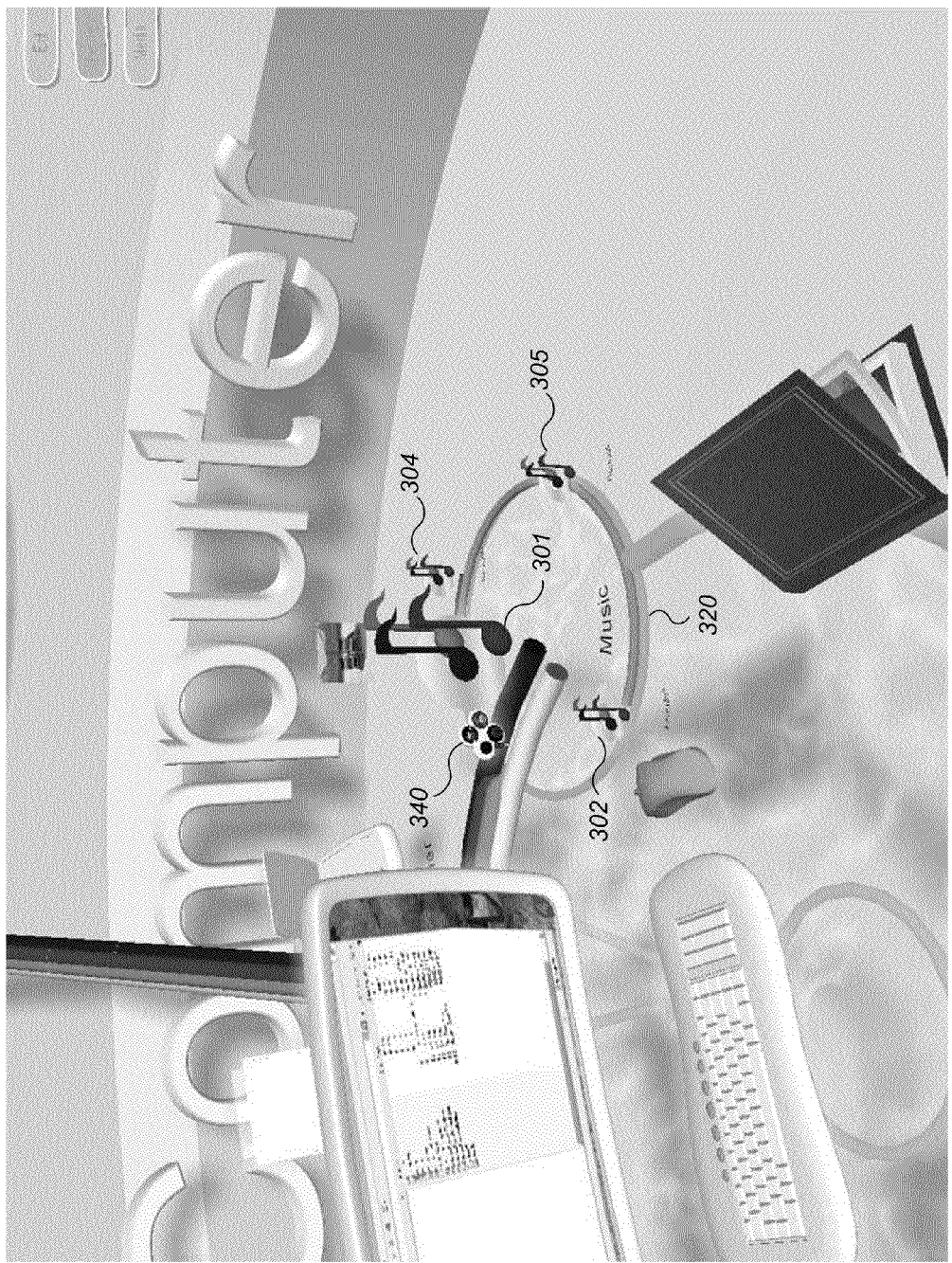
FIG. 3 is an example screen display of a data collection ring displayed by an example WorldView Display System.
Figure 4A:
FIGS. 4A and 4B illustrate still images from an example screen display of a cycling presentation of an active photo collection.
Figure 4B:

FIG. 3 is an example screen display of a data collection ring displayed by an example WorldView Display System. In FIG. 3, music data collection 301 is displayed in a center of a data collection ring formed by a representation of a cable 320. Music data collection 301 comprises three sub-collections: favorites sub-collection 302, workout music sub-collection 303, and classical music sub-collection 304. In one embodiment, when a collection (or a sub-collection) is made active and displayed, an animation or cycling presentation indicative of the contents of the data (e.g., a slide show of the data contents) is also displayed to allow the user to better ascertain the contents of the data collection. For example, FIGS. 4A and 4B illustrate still images from an example screen display of a cycling presentation of an active photo collection. The user gets a "preview" of the photos (contents) present in the active collection.

Note that representations of devices may or may not display data content when the device representations are depicted in a WVDS universe. That is, in a typical configuration, the device representations display data collections which in turn contain and are used to view data content. The device representations may also be configured to include "screen forwarding" capabilities. That is, device models depicted in WVDS, which have associated display screens, may be configured to receive screen display output updates from the corresponding device and display these (device output) updates within the WVDS environment, thereby "forwarding" screen updates from the device to the WVDS. Depending upon characteristics of the underlying system, such as performance capabilities, these updates may be received and displayed in near real-time. Such screen forwarding permits a user to see what is happening on the associated device, but from within the context of the user's connectivity universe. Screen forwarding may be configured as with other WVDS configuration settings; for example, through a WVDS supported user interface. Accordingly, the WVDS may be configured to support screen forwarding for all devices that support the capability; for just the active device; on a per device, per user, or per proximity band basis; according to certain parameters or heuristics that take into account factors such as clutter, performance, privacy, and/or security; etc.

Figure 5:
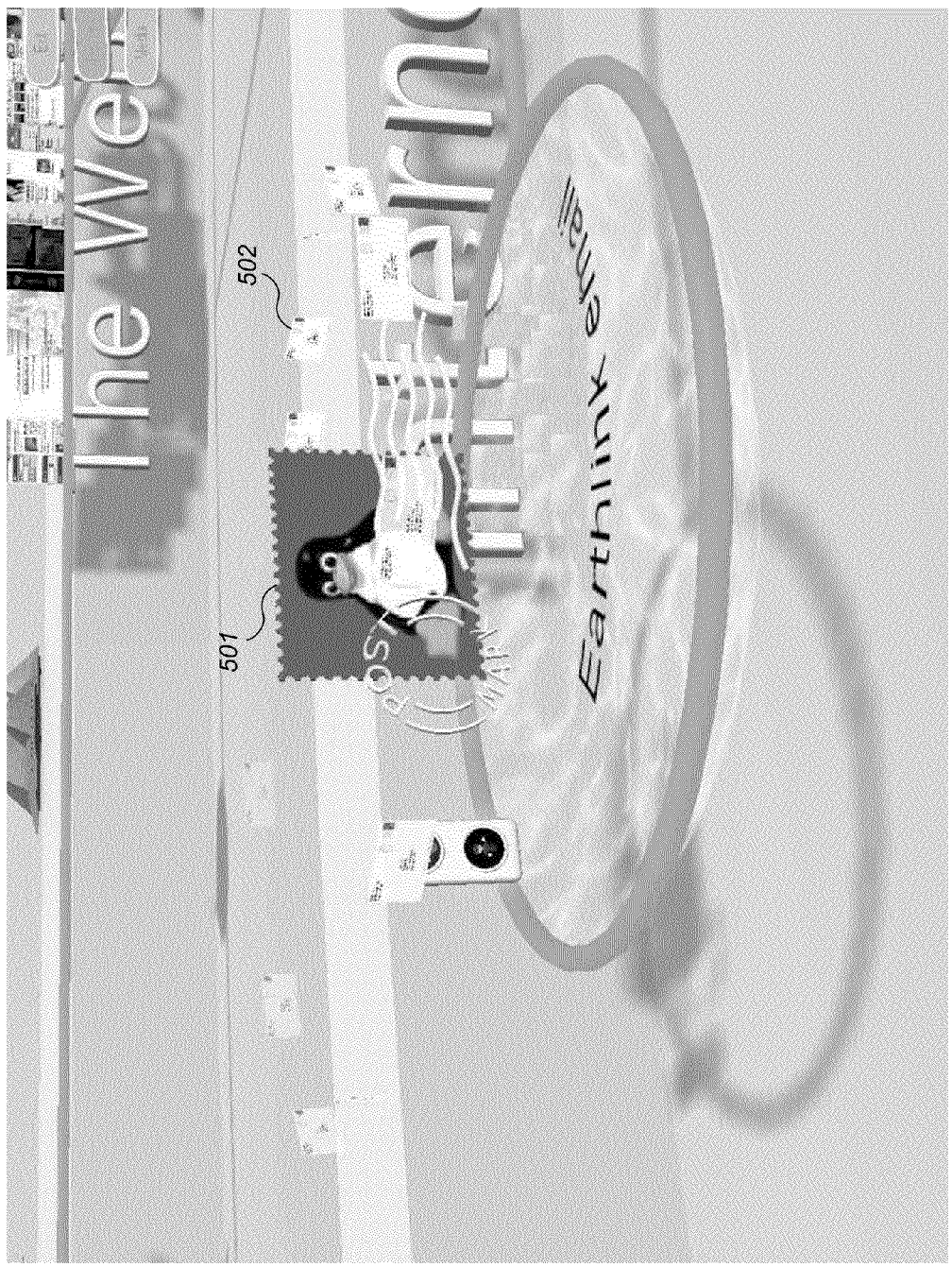
FIG. 5 is an example screen display of an animated representation of an active device.

Device representations may also be associated with some form of animation to highlight when they are active, or at other times. FIG. 5 is an example screen display of an animated representation of an active device. The indicated Internet service 501 (shown as an active device) is an email server for Earthlink email. The animated presentation 502 hints at the functionality of the service and indicates that there is some sort of mail accessible as content.

Figure 6:
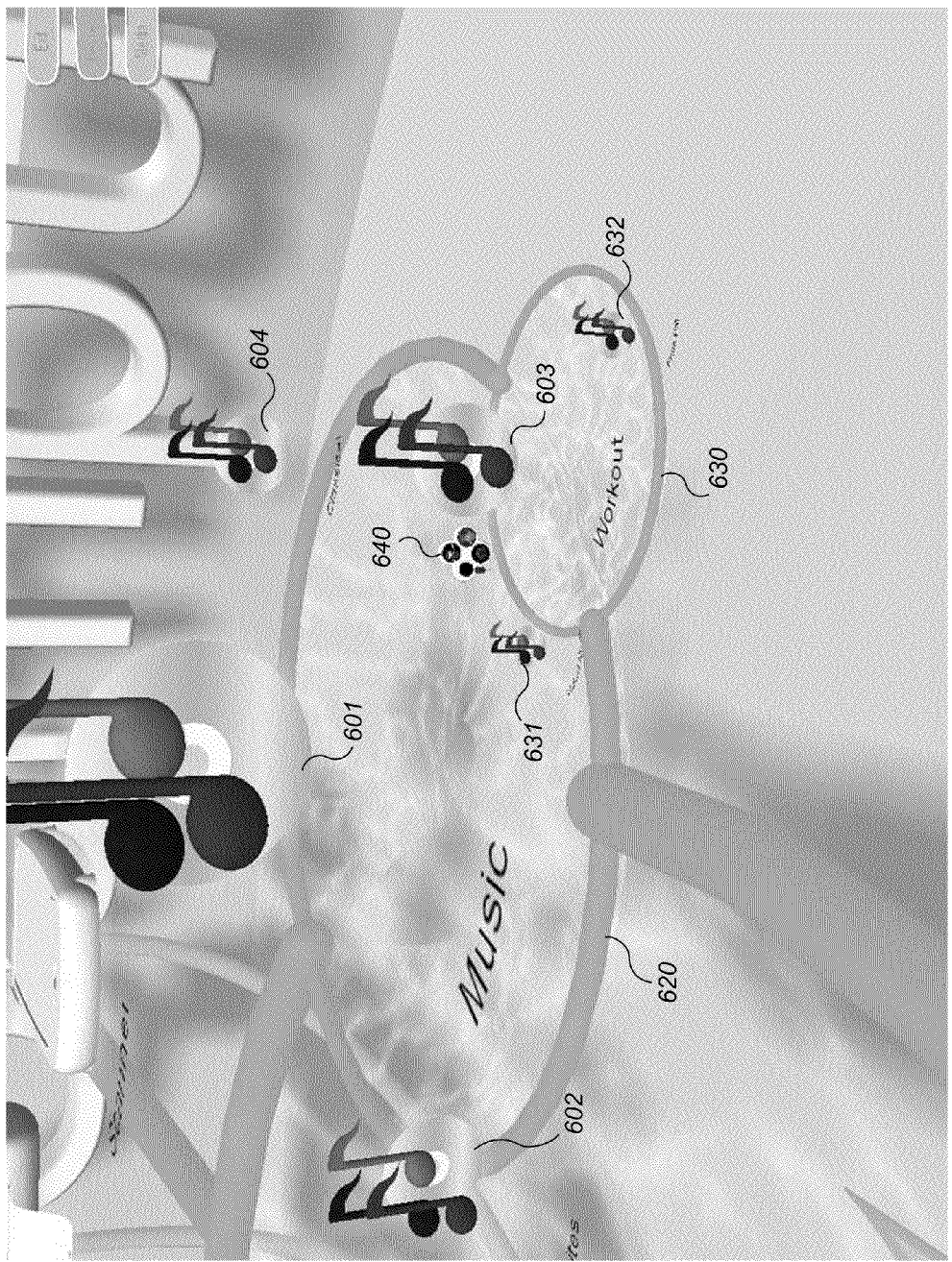
FIG. 6 is an example screen display of a data collection ring with a sub-collection ring displayed by an example WorldView Display System.

FIG. 6 is an example screen display of a data collection ring with a sub-collection ring displayed by an example WorldView Display System. Music data collection 301 from FIG. 3 with its surrounding data collection ring 320 is displayed in FIG. 6 as music collection 601. When an active sub-collection, for example, the workout sub-collection 303, contains further sub-collections (e.g., further groupings of data such as a particular album or a playlist), then a sub-collection ring for the sub-collection 303 is also displayed, if appropriate based upon the WVDS configuration settings. For example, in FIG. 6, Workout music sub-collection 603 (which represents music sub-collection 303 from FIG. 3) is displayed surrounded by a sub-collection ring 630, which further contains sub-collections Workout Albums music sub-collection 631 and From Pat music sub-collection 632.

Figure 7:
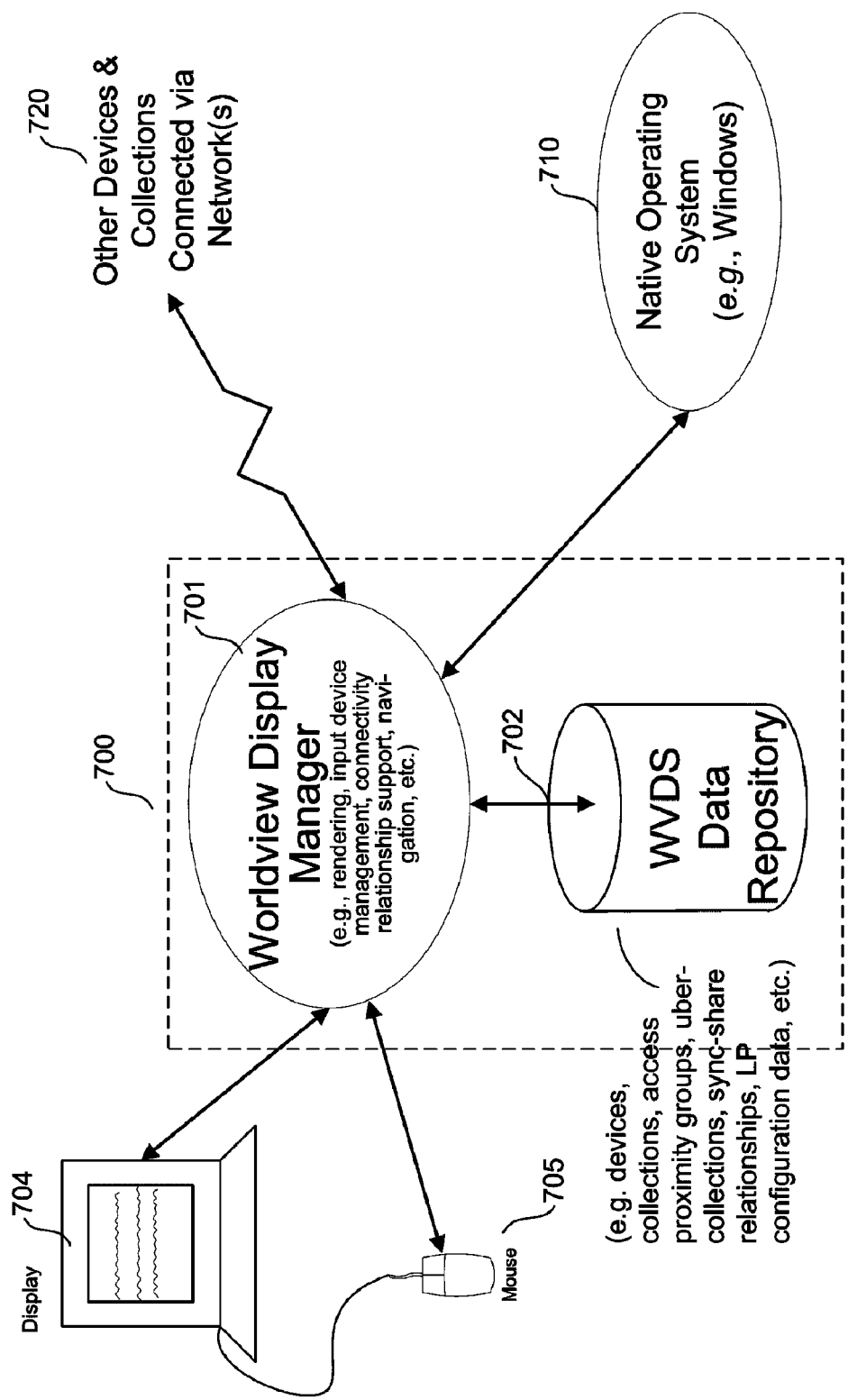
FIG. 7 is an example block diagram of how components of an example WorldView Display System are incorporated in a computer system to provide a user interface to an example user's universe of devices, collections, and connections.

In one embodiment, the WorldView Display System comprises one or more functional components/modules that work together with other parts of a user's online environment to model a user's connectivity universe. The components and/or sub-components of a WVDS may be implemented in software or hardware or a combination of both. FIG. 7 is an example block diagram of how components of an example WorldView Display System are incorporated in a computer system to provide a user interface to an example user's universe of devices, collections, and connections. The WVDS 700 comprises WorldView display support modules 701 and one or more WVDS data repositories 702. The display support modules 701 support functions such as rendering a multi-dimensional representation, managing the information associated with the objects in users' connectivity universes (such as lists of devices, data collections, connections, and configuration data), input device handling and management (e.g., redirecting input from the host system to an associated device to be processed by its native user interface), screen forwarding handling and management, status information regarding connectivity relationships, navigation support, and interfaces to various devices where appropriate. The data repositories 702 maintain information corresponding to the devices, collections, connections, access proximity groups, synchronization/sharing relationships, rendering information, and WVDS configuration data. In overview, the WVDS 700 communicates with other devices and collections 720 that are connected via one or more networks to obtain status information regarding objects and to share data content when appropriate. The WVDS 700 communicates with the native operating system 710 of the host device to obtain connectivity universe information and to interface to a particular device's native user interface (such as the default user interface on a Microsoft Windows-based computer system or whatever interface is being presented on the device). The WVDS 700 renders a representation of the user's connectivity universe on display system 704, and receives input from input devices, such as mouse 705. The environment demonstrated in FIG. 7 is one example environment that can incorporate a WVDS and that many other environments with different components and different means for interacting with the various devices may be supported.

Figure 8:
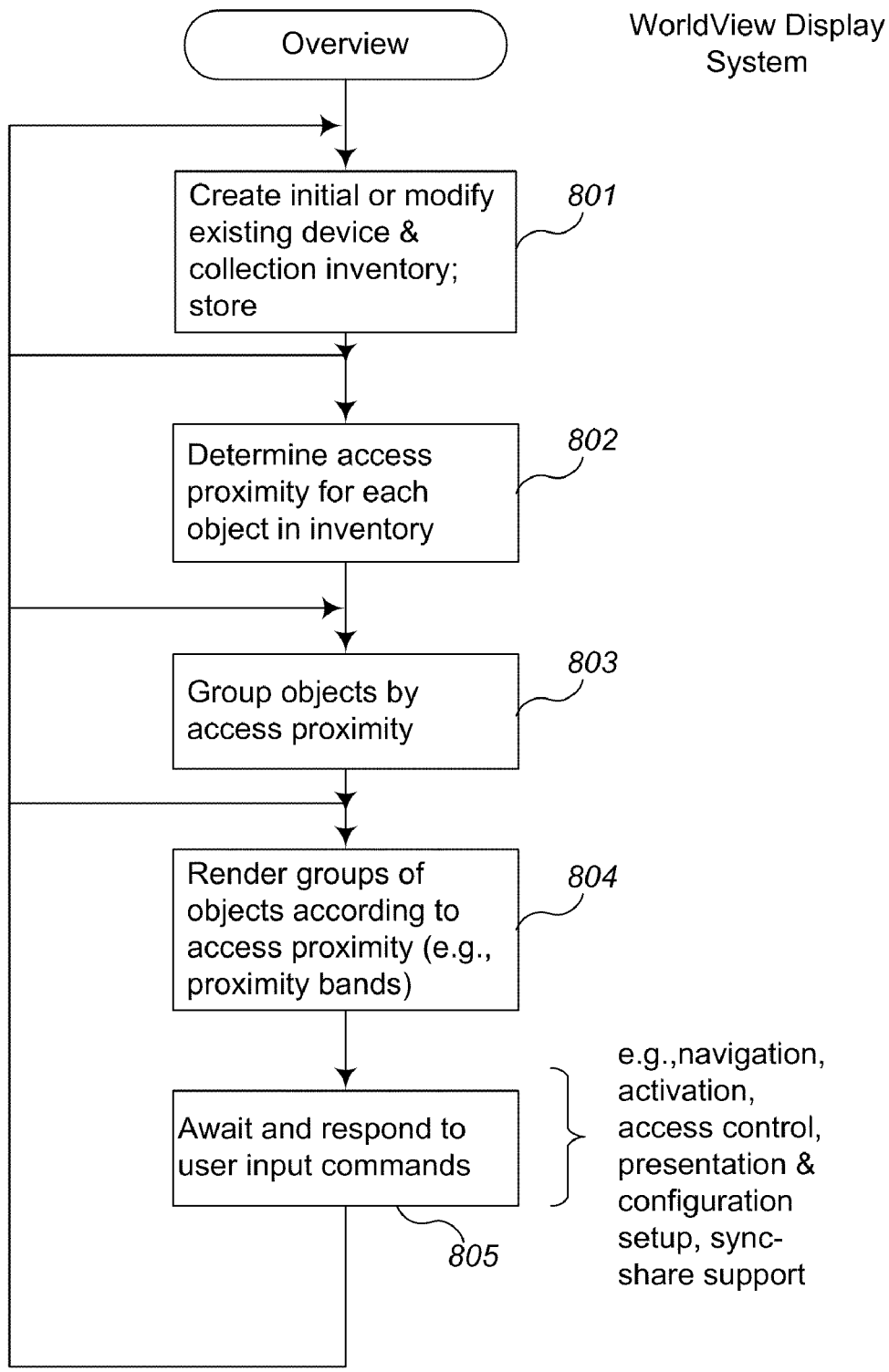
FIG. 8 is an overview flow diagram of operations performed by an example WorldView Display System.

FIG. 8 is an overview flow diagram of operations performed by an example WorldView Display System. In step 801, the WVDS determines the objects that comprise a particular user's connectivity universe. In step 802, the WVDS determines a measure of access proximity for each object in the inventory. In step 803, the WVDS arranges the objects with similar measures into groups according to an internal model of groups and any relevant WVDS configuration parameters. In step 804, the WVDS renders the groups of objects in a multi-dimensional rendering in accordance with an internal model and WVDS configuration settings. In step 805, the WVDS awaits input, for example from a user through user interface commands, or for example through a programming interface provided via an applications programming interface ("API"). The commands may include instructions to the WVDS to navigate to a particular location in the display, change the viewing angle, or change the detail shown, modify a user's access control relative to a particular object, configure WVDS parameters, set up data sharing connections, or invoke the native interface of an object. These commands are examples, and a variety of other commands additionally could be implemented by a WVDS. When a particular command is recognized by the system, the WVDS returns to execute the appropriate step 801-804. Each of these steps is described in further detail in the description that follows.

Although the techniques of modeling a user's connectivity universe and the WorldView Display System are described with reference to a external application running as a separate module(s) in addition to a native operating system, the techniques of the presented embodiments can also be used directly by an operating system to present an alternative metaphor to its own devices and data collections, as well as to other devices and data collections to which the operating system has access. Also, as illustrated with respect to FIGS. 26A-26F, a user can navigate seamlessly between the native operating system user interface and the WVDS user interface. Also, although many of the examples of multi-dimensional representations described herein refer to three-dimensional representations and rendering, the term "multi-dimensional" includes any number of dimensions greater than one, including a two dimensional representation. The techniques described herein can be accordingly adapted as appropriate to the number of dimensions used to represent objects in the environment, or the WVDS environment itself. In addition, the concepts and techniques described are applicable to other environments, including other applications, embedded systems, network management, etc. In brief, the concepts and techniques described are applicable to any display management environment or any other environment that desires to present a uniform interface to on-line entities and relationships.

Example embodiments described herein provide applications, tools, data structures and other support to implement a WorldView Display System to be used for managing resources and relationships in a user's online world. Other embodiments of the described techniques may be used for other purposes, including for other types of user interfaces. In the following description, numerous specific details are set forth, such as data formats and code sequences, etc., in order to provide a thorough understanding of the described techniques. However, the described embodiments also can be practiced without some of the specific details described herein, or with other specific details, such as changes with respect to the ordering of the code flow or module arrangement or using different algorithms entirely.

As referred to in step 801 in FIG. 8, the WVDS determines the objects that comprise a particular user's connectivity universe. The user's connectivity universe comprises a variety of objects, which include physical and virtual devices, services, and data collections. Typical devices supported include, and are not limited to: personal computers, portable computers, PDA's, phones, cameras, network servers, including email servers or messaging servers, web servers, buddy rooms (shared data accessible through devices not typically controlled by the user), printers, scanners, disk drives, card readers, biometric scanners, music players, video players, etc. Typical data collection types include, and are not limited to: music, photos, video, files, contacts, email, web pages, newsgroups, favorites, history, and other types of media. Although "favorites" and "history" traditionally aren't treated as types of data, for the purposes of the WVDS they can be treated as such since a designation of "favorite" or on a recent "history" list connotes a determinable characteristic of the associated data. The devices and data types recognized and supported by a WVDS may change over time and from system to system.

In some embodiments, the WVDS supports an interface for adding new devices, collections, and types of data collections. By initiating a user interface dialog with the WVDS from a particular location on the displayed presentation, the user can bring up a dialog with the WVDS to specify a new device, collection, or collection type (media viewer/player). For example, by right clicking on a proximity band, the user can indicate a new device to be recognized (e.g., a specific computer system or a newly attached printer) and added to that particular proximity band. In an alternative embodiment, the dialog and new device are not proximity band specific (or the user can specify that they are not) and the WVDS automatically determines where to add the new device in its internal model. Similarly, the user can right click on the Media Viewers proximity band to add a new type of collection viewer to be discoverable. Media Viewers are described below with reference to FIG. 14. The user can also, for example, right click on a device to add a new collection. In addition, in some embodiments, the WVDS automatically recognizes existing and new devices and collections and automatically determines where to add them in its internal model. The WVDS may also support a general "settings" user interface, accessible from a button or other component on the screen, which also allows the user to configure devices, collections, collection types, access proximity characteristics, proximity band groupings, screen forwarding, input redirection, etc.

When initially executed, the WVDS creates and stores an initial inventory of the objects with which the user has a relationship. Since objects may come and go and relationships may change, this inventory is modified on some determined basis. For example, the WVDS may perform updates at specific times (such as the beginning of a session), at preprogrammed times (such as once a day), by registering a callback routine to be invoked by the operating system when a device is accessed or its settings changed, or, for example, in response to a specific update request initiated by the user. The initial inventory of objects may be constructed by discovering objects from a variety of resources, including, for example, from operating system services, which enumerate registered devices (e.g., local disk drives, connected printers, scanners, email servers, and web page histories); application programs that interact with network devices; and user input provided in response to a specific query or provided as configuration information using a user interface of the WVDS, etc.

Once the universe of objects is determined, then the WVDS determines as assessment of access proximity for each object in the inventory. (See step 802 in FIG. 8.) As described above, access proximity can be assessed by examining and evaluating the characteristics of the network connectivity associated with the object relative to the user and the amount of control the user has over the object, along with potentially other considerations. For example, devices directly attached to the host device may be associated with one class of access proximity; devices that are connected via the same LAN to which the host device is connected may be associated with a second class of access proximity; devices to which the user relates through wireless connections may be associated with a third class of access proximity; objects to which the user shares data over the Internet but the source of the data is determined remotely may be associated with a fourth class of access proximity; and objects which the user has recently accessed over the Internet but has no control over may be associated with a fifth class of access proximity. Many alternative classification schemes exist, and that the above example represents one of those contemplated.

After automatically determining the access proximity for each object, the WVDS arranges the objects with similar measurements into groups according to an internal model of groups and any relevant WVDS configuration parameters. (See step 803 in FIG. 8.) The grouping of objects comprising the connectivity universe and the layout that supports representing the groupings is based upon an internal model of connectivity and access proximity that the WVDS dynamically builds and maintains over time and any relevant WVDS configuration parameters. In one embodiment, this model is configurable to the extent desired, including, for example, the characteristics used to determine access proximity, the number of groups (e.g., proximity bands) and to what class (or characteristics) of access proximity each group corresponds, and a specification of the circumstances under which a particular group is displayed and how objects are displayed. For example, in an embodiment supporting proximity bands, certain bands may always be displayed, others displayed only if they contain objects, others displayed based upon rules such as the presence of another alternative band, and others displayed based upon particular viewing parameter settings. Other rules can also be incorporated as desired.

Figure 9:
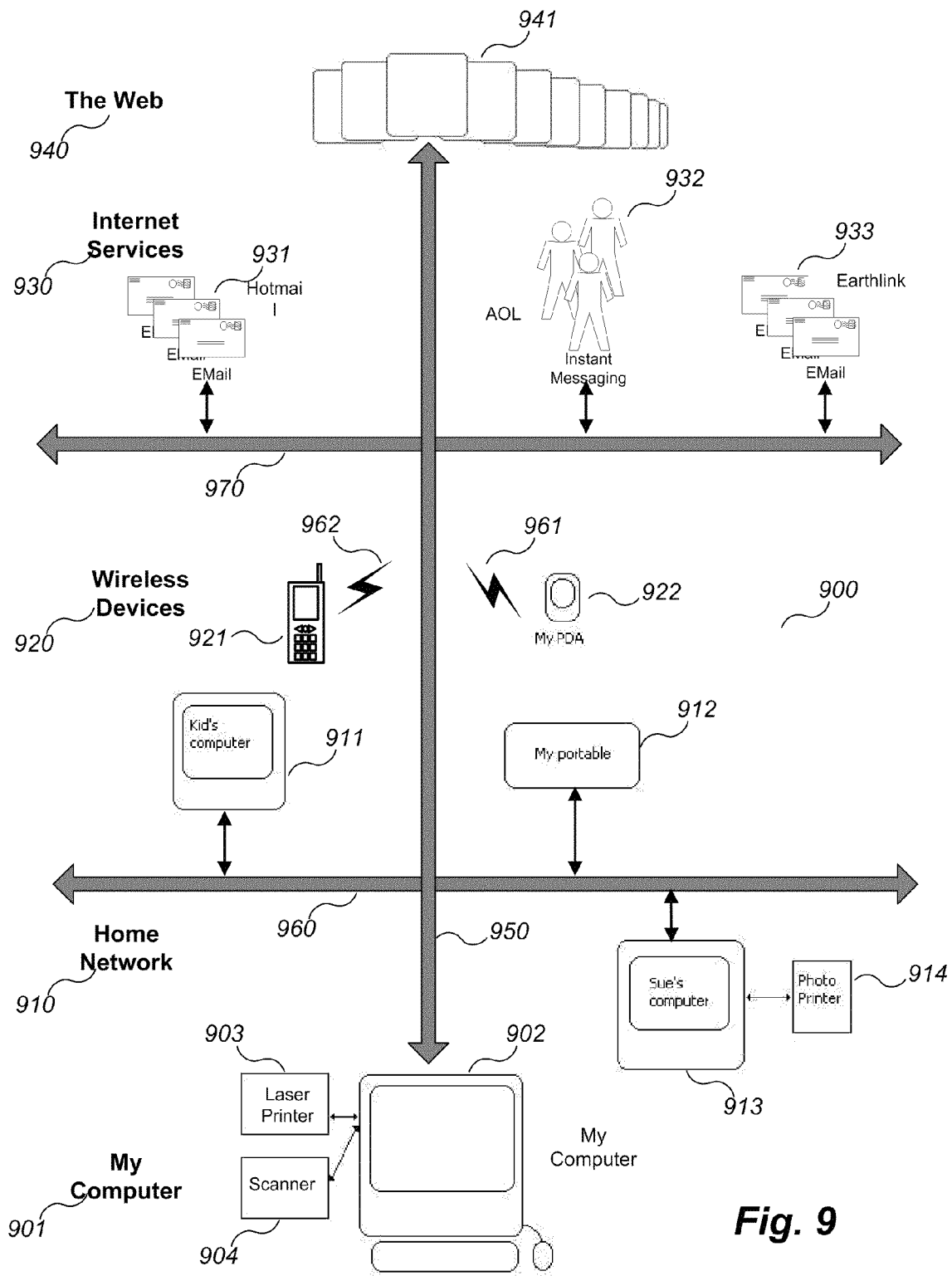
FIG. 9 is an example block diagram of a portion of one internal model of an example connectivity universe by an example WorldView Display System.

FIG. 9 is an example block diagram of a portion of one internal model of an example connectivity universe by an example WorldView Display System. In FIG. 9, the model 900 schematically illustrates objects organized according to five different groups 901, 910, 920, 930, and 940, each corresponding to a defined class of access proximity. An example WVDS may display many different graphical representations of the same model, including, for example, 2-D and 3-D representations, proximity bands, and other displays of groupings of objects. For purposes of illustration, the groups shown in FIG. 9 correspond to the proximity bands shown in FIG. 1, although the particular objects shown in the model are not the same as those presented in FIG. 1. Group 901 "My Computer" contains a single object computer system 902, with attached devices laser printer 903 and scanner 904.

Group 901 is attached to all of the other groups through a "trunk" network 950, in this case the Internet (and to the user's Home Network group 910 through a LAN connection). Group 910 "Home Network" contains three devices that communicate with the user through a LAN 960: computer system 911, portable computer system 912, and computer system 913 with an attached photo printer 914. Group 920 "Wireless Devices" contains two devices, cellular phone 921 and PDA 922, that communicate with the user through trunk network (Internet) 950 and wireless connections 961 and 962. Group 930 "Internet Services" contains three services, two email services 931 and 933 and a messaging service 932, which communicate with the user through the Internet 950, and whose associated server devices are attached through Internet connections 970. Group 940 "The Web" contains links to pages of web sites 941 that the WVDS determines are of interest to the user based upon (optionally settable) parameters, such as newsgroups, favorites, and access history.

Table 1 below illustrates an example inventory created by a WVDS using one or more sources as described in step 801 and arranged according to the access proximity assessments described in steps 802-803.

TABLE 1

| | |
|---|---|
| Web Sites | 60 Favorites with 8 sub-folders |
| | 4 weeks of history entries, within a time hierarchy |
| | 10 newsgroups accessed within a specific time period |
| Internet Services | Hotmail email account |
| | Earthlink email account |
| | AOL Instant Messenger service |
| Buddy Rooms | 3 photo buddies |
| | 2 chat buddies |
| Wireless Devices | 1 cellular phone |
| | 1 PDA |
| Home Network | 1 laptop computer |
| | Spouse's computer with attached photo printer |
| | Kid's computer |
| My Computer | User's computer |
| | Attached laser printer and scanner |
| | Flash card reader |
| | Internal storage: 1 hard drive, 1 DVD drive, 1 CD drive |

The objects shown in Table 1 are arranged according to the internal model of the WVDS, a portion of which is depicted in FIG. 9. Although not shown in Table 1, the WVDS also keeps track of the particular types of data and collections of data associated with each object. Any number of well-known ways can be used to do track the content of the objects, including querying a service, invoking the operating system to list a devices' contents, searching registries, etc.

The "Buddy Rooms" indicated in Table 1 are virtual devices that are used to navigate to or represent data collections to which the user has access rights but that are hosted remotely and are not represented to the user through some other device relationship that the user has sufficient access rights to see as a device in some other grouping. Thus, Buddy Rooms provide a means of user interface access to the user that otherwise wouldn't be available from the other groupings of objects. For example, if a data sharing relationship is established with a second user's photo collection, and that photo collection resides on a disk drive of the second user to which the user does not otherwise have access, then the WVDS may present the second user's photo collection as a Buddy Room in the user's connectivity universe. A chat room provides another example of a buddy room.

Figure 10:
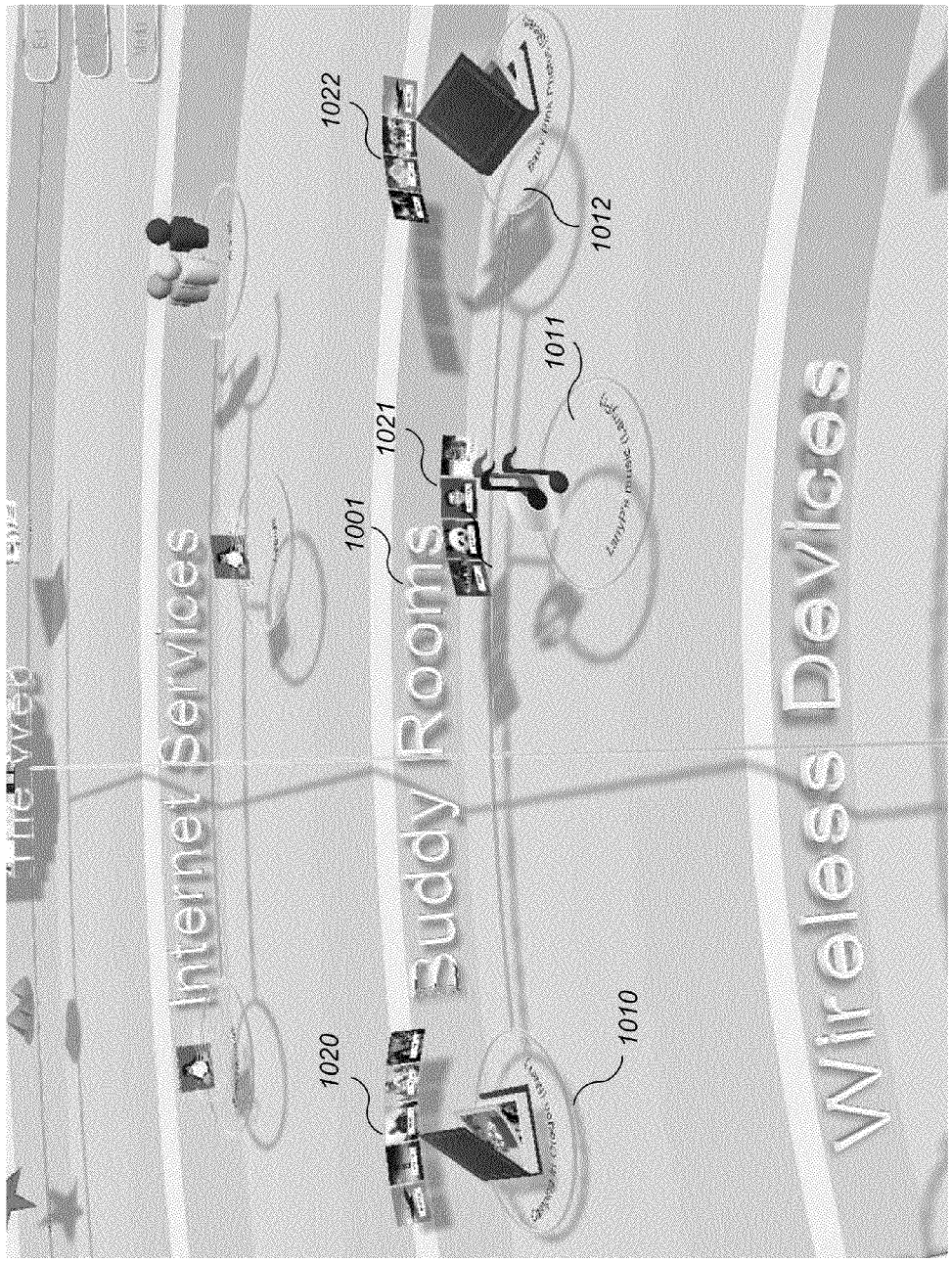
FIG. 10 is an example screen display of an example Buddy Room proximity band.

FIG. 10 is an example screen display of an example Buddy Room proximity band. Buddy Room proximity band 1001 contains three shared data collections: photo collection 1010, music collection 1011, and photo collection 1012. In one embodiment, each data collection is shown with a corresponding set of access cards 1020, 1021, and 1022, respectively, so that the user can see which users have what type of access to each shared data collection (presuming the user is authorized to see this information). The front of each access control card summarizes the access privileges associated with a particular user. Access control cards are described below with reference to FIG. 23. In some embodiments, the Buddy Room proximity band 1001 is referred to as "Friend's Computers."

Once an inventory of objects (and their data collections) has been created and grouped according to the WVDS internal model (or modified as directed), then the WVDS renders the groups of objects in a multi-dimensional rendering such as the proximity bands illustrated in FIG. 1 in accordance with the internal model. (See step 804 in FIG. 8.) A different rendering engine may be incorporated into the WVDS to generate displays other than those described with reference to the Figures herein.

In some embodiments, the WVDS represents the groups of objects in a user's connectivity universe using proximity bands and renders them to look three dimensional. In one such example embodiment, the WVDS defines several different views of default proximity bands—a device centric view, a media centric view, and a combination view. In an example embodiment, a device view displays data content present in the user's connectivity universe from within the context of the devices on which the data resides. Using device view, a user can easily view and specify settings for, and interact with devices. A media view displays data content present in the user's connectivity universe based on its media type, independent of the devices on which the data resides. Using media view, a user can easily view and manipulate data based upon its type regardless of where the data resides—and thus does not have to search for the data and perform a desired operation multiple times in multiple locations. The different views are toggled on and off, for example, using buttons 130 and 140 in FIG. 1. A mixed view can be achieved by toggling on device view and media view. Other combinations and other views, including filters of existing views, can similarly be incorporated.

In a typical default device view, such as that shown in FIG. 1, several proximity bands are presented. A "My Computer" proximity band (e.g., band 101) is typically displayed when the user's host device is a personal computer or when the user has designated a particular device as "My Computer" through the WVDS configuration tools. A "Home Network" proximity band (e.g., band 102) is typically displayed if there is a home network. If the host device is on a LAN that isn't a home network, then a "LAN" proximity band is typically displayed. A "Wireless Devices" proximity band (e.g., band 103) is displayed by default whether there are devices present within in or not. A "Buddy Room" proximity band is displayed if the user has access to shared data collections that are hosted remotely (on someone else's devices) and the shared data collections not already accessible through one or more devices that are shown in one of the other proximity bands. Each such shared data collection appears as a collection within the Buddy Room proximity band. If the source of the shared data is controlled by or belongs to a device controlled by the user (as determined, for example, through access rights), then the shared data shows up as a collection on that device ring in an appropriate proximity band. A "Network Services" proximity band (e.g., band 104, also referred to as "Internet Services" when the network of interest is the Internet) is displayed by default whether there are objects present within it or not. A "Web" proximity band (e.g., band 105, also referred to as a "Web Deck" or "The Web") is present if the underlying network is the Internet. The Web proximity band is described further with reference to FIGS. 11 and 12. Note that the behaviors of one or more of these proximity bands can be configured through the configuration interfaces of the WVDS, and proximity bands can be added or deleted. Also, other labels for proximity bands are also contemplated and potentially configurable.

Figure 11:
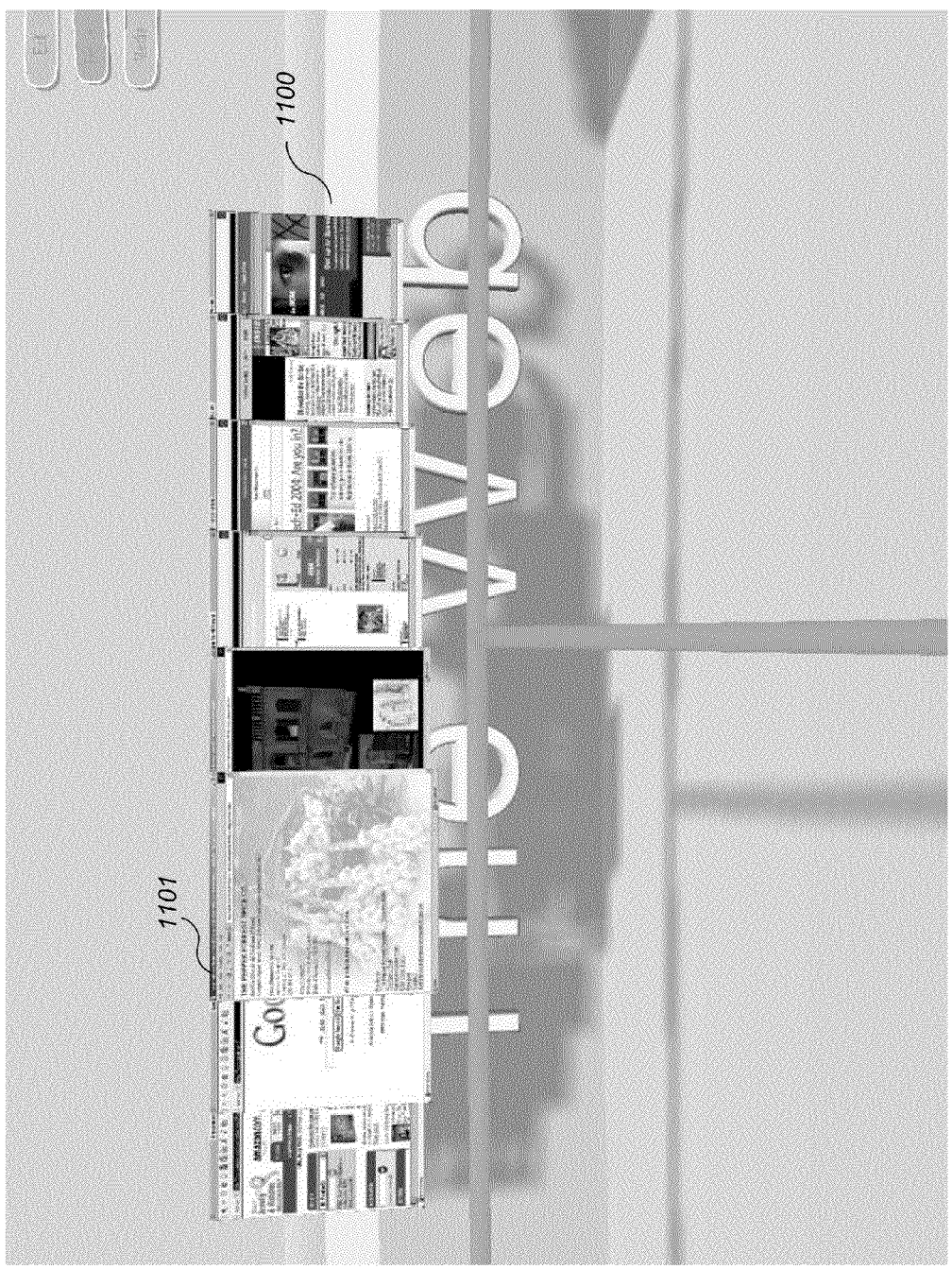
FIG. 11 is an example screen display of a close-up view of an example Web proximity band.
Figure 12:
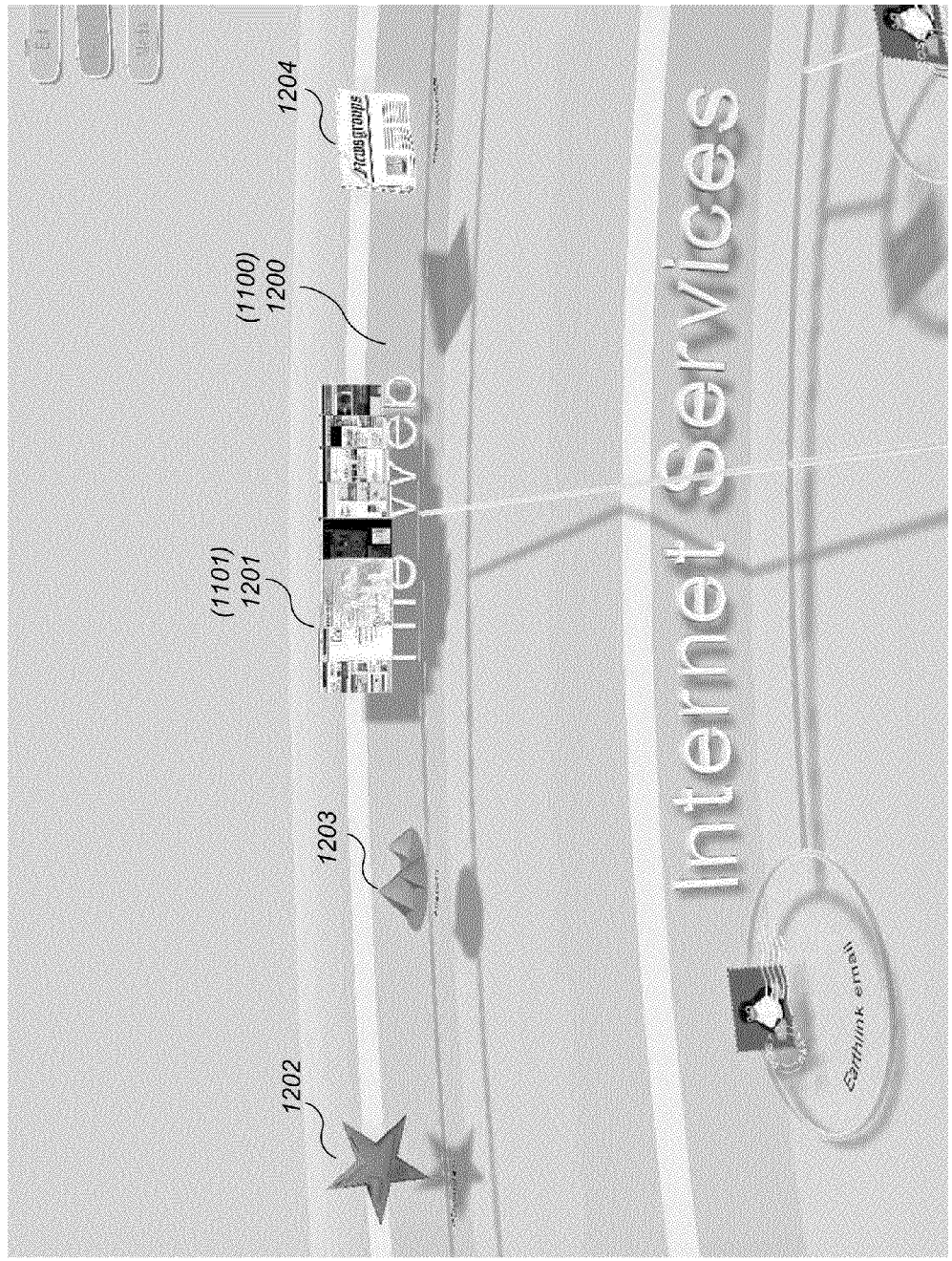
FIG. 12 is an example screen display of an example Web proximity band.

FIG. 12 is an example screen display of an example Web proximity band. FIG. 11 is an example screen display of a close-up view of an example Web proximity band. The Web proximity band 1100 in FIGS. 11 and 1200 in FIG. 12 is configured by default to show some number of the user's Favorites and History (as determined from parameters associated with the user's Internet browsers) websites, as well as public collections such as Usenet newsgroups. For example, in one embodiment the Web proximity band 1200 contains Favorites web pages 1202; History web pages 1203, which, for example, shows web pages accessed within a designated time frame; and Newsgroups 1204. The Web deck 1201 (1101) represents an "animation" of the data collections contained in the Web proximity band 1200. In one embodiment, when one of the data collections 1202-1204 is made active, the Web deck animation 1201 (1101) is changed to shown a representation of the contents of the data collection. Many other data collections of web pages, for example, by search or sorting filters, etc., could be incorporated in a similar fashion.

Figure 13:
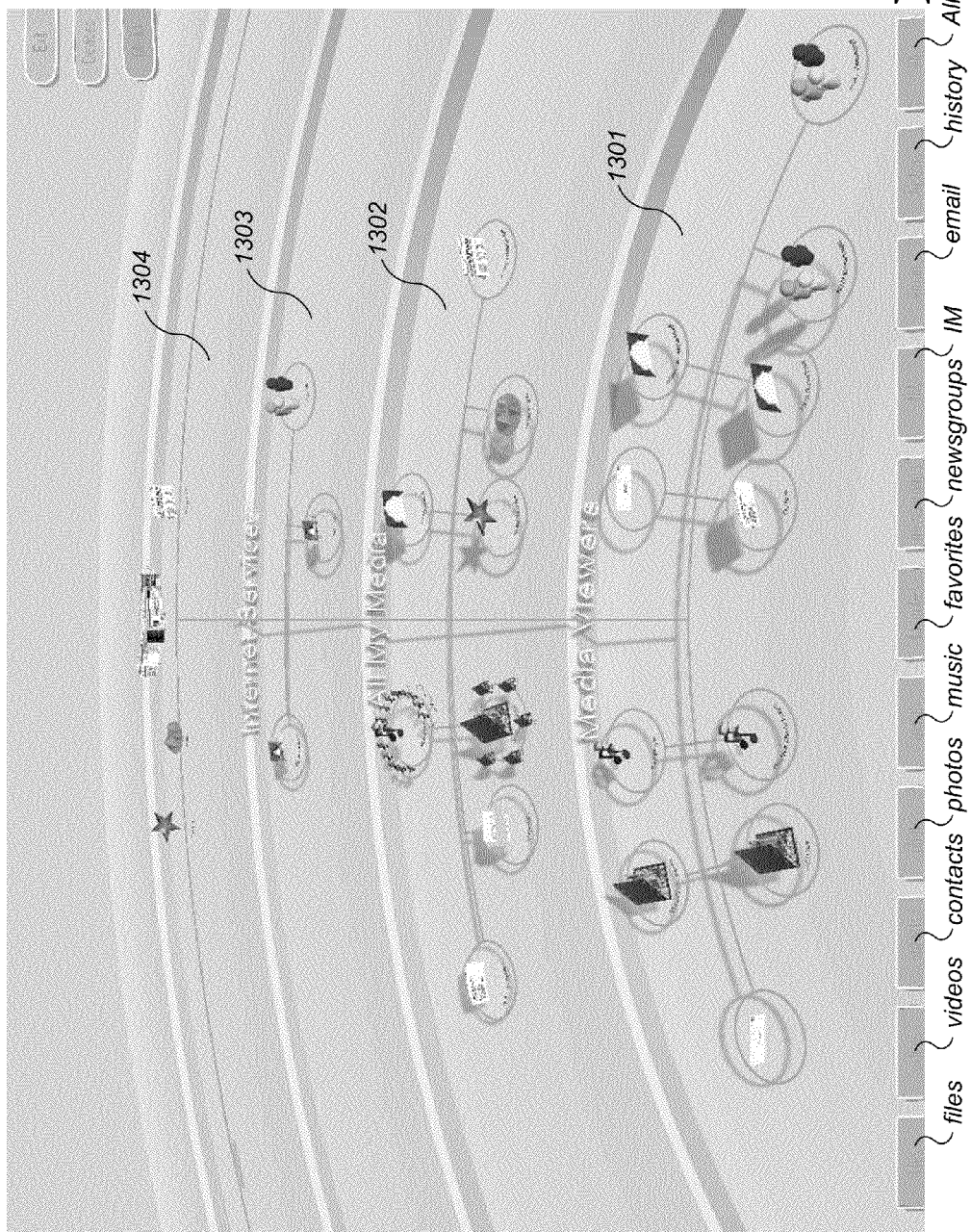
FIG. 13 is an example screen display of a media view of an example WorldView Display System.

FIG. 13 is an example screen display of a default media view of an example WorldView Display System. Several proximity bands are displayed by default. For example, the "Media Viewers" proximity band is displayed by default whether there are objects present within it or not. This band groups the viewers present in the user's connectivity universe for the different types of content (data collections) supported by the WVDS. An "All My Media" proximity band 1301 is used to group each type of data collection regardless of the device where the data collection is found, e.g., all music collections accessible to the user across all devices with which the user has a relationship. That is, the data collections displayed in the All My Media proximity band 1302 are "uber-collections"—they represent all of the data found in data collections of a particular data type, with which the user has a relationship, regardless of location. The uber-collections displayed in proximity band 1302 in media view can be filtered based upon the buttons 1305. Buttons 1305 include support as shown for different "types" of media present in the user's connectivity universe, including: files, videos, contacts, photos, music, favorites, newsgroups, IM (instant messaging) messages, email, and history. Different and/or additional media types are supportable by a WVDS. In one embodiment, two proximity bands are additionally displayed by default regardless of the view: an Internet Services proximity band 1303, and a The Web proximity band 1304. These are as described with reference to FIG. 1.

Figure 14:
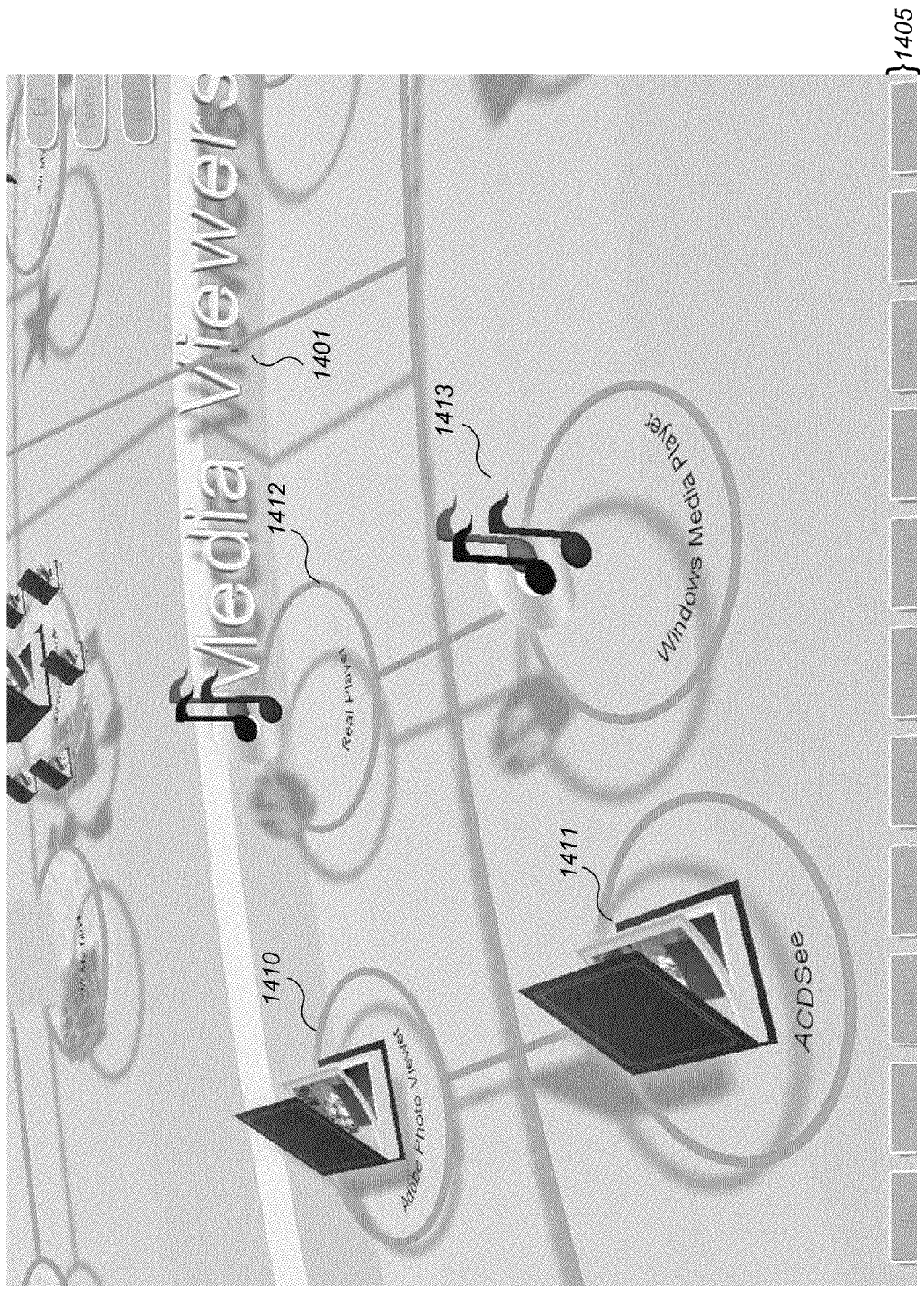
FIG. 14 is an example screen display of media viewers presented by a media view of an example WorldView Display System.

FIG. 14 is an example screen display of example media viewers presented by an example media view of an example WorldView Display System. It is a "close-up" of a portion of the Media Viewers proximity band 1301 representation illustrated in FIG. 13, and can be achieved by navigation to that area of the representation. Specifically, the illustrated portion of the Media Viewers proximity band 1301 contains four data collection viewers: photo viewers 1410 and 1411 for interacting with photos and music viewers (players) 1412 and 1413. Each viewer is shown as a device ring (or data collection ring) without any collections. As mentioned, a user can add new media viewers to be discovered (recognized) by the WVDS by adding a new media viewer/player to the Media Viewers proximity band through a user interface available from the WVDS. In addition, the WVDS will automatically recognize new Media Viewers that are added to devices in the user's connectivity universe.

Figure 15:
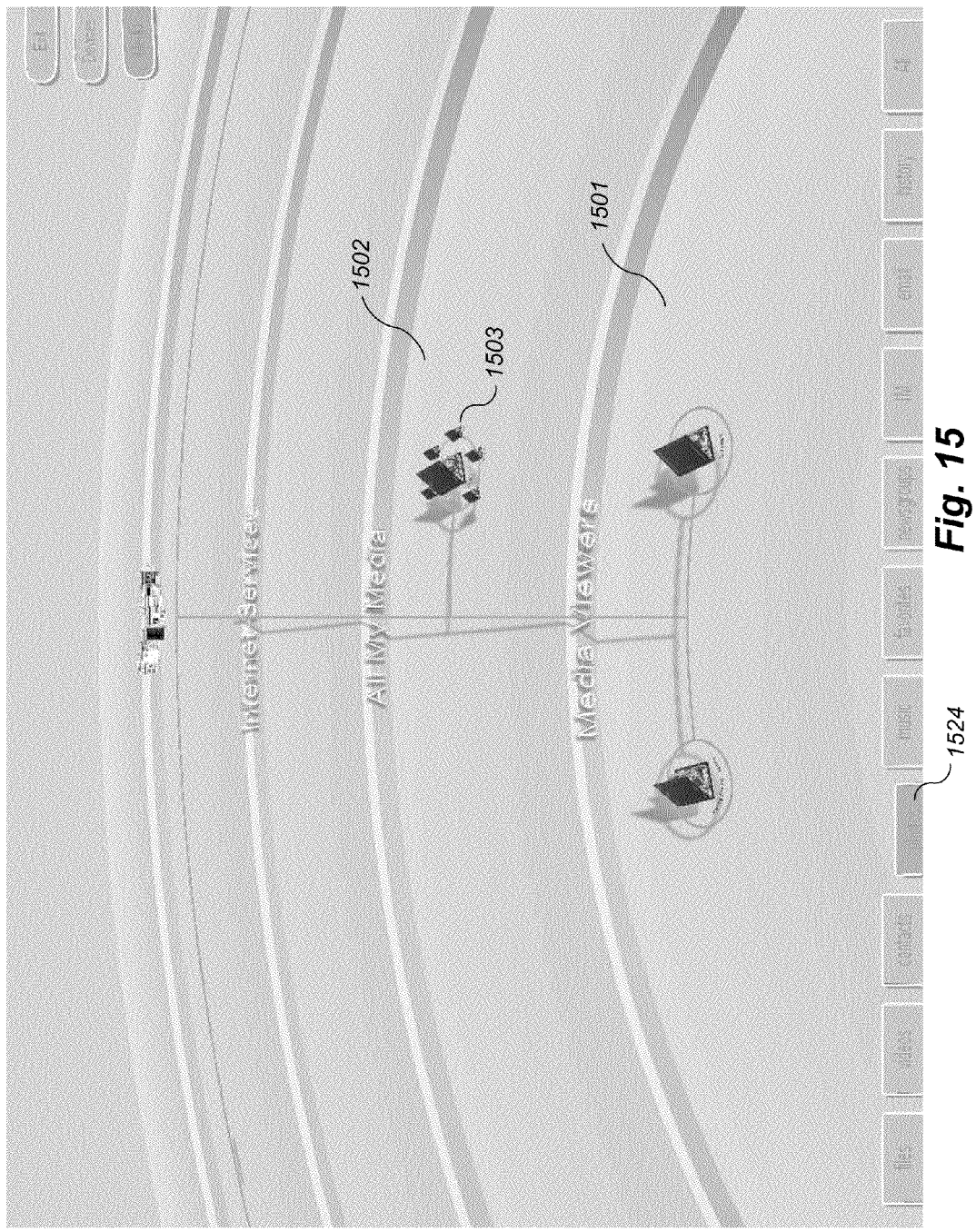
FIG. 15 is an example screen display of objects displayed as a result of filtering a media view of an example WorldView Display System.

FIG. 15 is an example screen display of objects displayed as a result of filtering a media view of an example WorldView Display System. In this case, the media view has been filtered to view "photos" only by pressing filter button 1524. (In one embodiment, each button cancels any prior filters and applies the filter that corresponds to the current pressed button. Other filters can be cumulatively added by pressing a key in combination with the button. Other embodiments provide other behavior such that each button is an on/off toggle, etc.) When filtered, the Media Viewers proximity band 1501 only contains the media viewers that correspond to the filtered data type(s), in this case the photo viewers 1410 and 1411 shown in FIG. 14. The All My Media proximity band 1502 contains the data collections that correspond to the filter. In this case, the All My Media proximity band 1502 contains one uber-collection, photo collection 1503, which represents all of the photos that the user has a relationship with. When present, the contents of other proximity bands, such as the Internet Services proximity band and the Web proximity band, are also correspondingly filtered.

Figure 16:
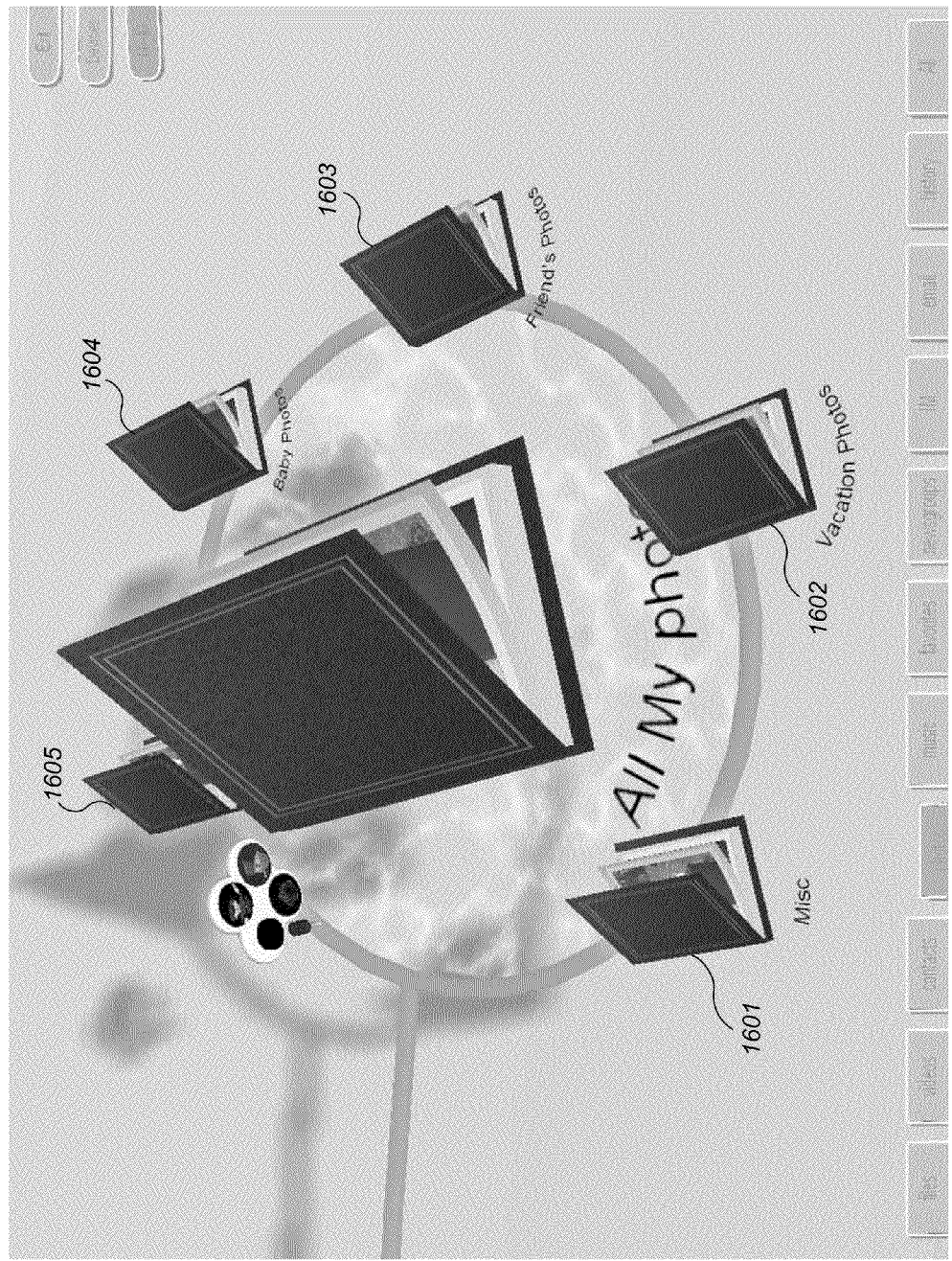
FIG. 16 is an example screen display of uber-collections presented by a media view of an example WorldView Display System.

FIG. 16 is an example screen display of a close-up of an uber-collection presented by a media view of an example WorldView Display System. In this case, the photo uber-collection 1503 is shown in close-up form, as a data collection ring with several sub-collections 1601-1605. When a user activates one of these sub-collections, it may display further sub-collection rings as appropriate.

Figure 17:
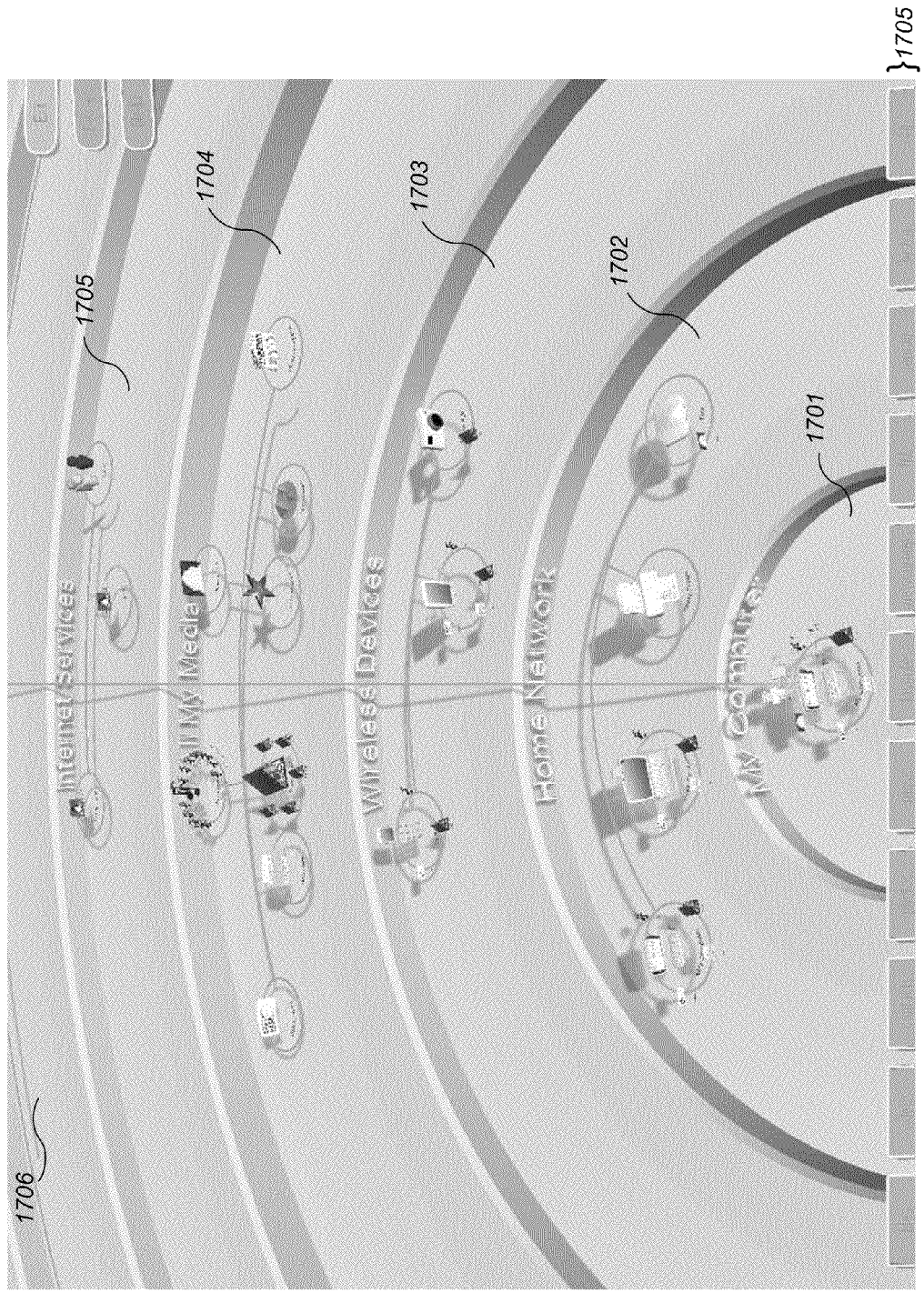
FIG. 17 is an example screen display of a combined device and media view of an example WorldView Display System.

FIG. 17 is an example screen display of a combined device and media view of an example WorldView Display System. Although it is not possible to view the whole universe in FIG. 17 (the Web proximity band 1706 is not displayed at this camera angle and zoom setting), the representation shows all of the proximity bands 1701-1703 and 1705-1706 present in FIG. 1 plus the uber-collections represented in the All My Media proximity band 1704. In addition, the buttons 1705 continue to be displayed so that the user can filter the uber-collections displayed in proximity band 1704 and any objects displayed within the other proximity bands.

As mentioned, views other than a device view or a media view can be supported by a WVDS. For example, a view that filters the connectivity universe by a user's relationships with certain individuals can be incorporated. In one embodiment, a People filter button (shown for example in FIGS. 4A and 4B) is presented along with the Media and Device view buttons (see, for example, button 130 and 140 in FIG. 1). When the People view is toggled on, an additional row of filter buttons (not shown), with labels corresponding to the individuals with which the user has a relationship (as discovered by the WVDS or configured by the user) is presented like the media filter buttons 1705 in FIG. 17. When a user selects a particular person filter button, then the WVDS adjusts the layout of the connectivity universe representation to show devices, media, viewers, etc. that are related to the relationship between the user and the designated person. For example, the devices, services, collections, and Buddy Rooms displayed are those to which the user and the persons designated by the selected filters have access. Other representations can also be adjusted as appropriate. For example, email viewers can be adjusted to only show data collections (email content) that relates to the filter universe of people. A variety of other types of filters could also be accommodated by a WVDS.

Once the WVDS has rendered a representation of the connectivity universe associated with a user, the user (or a program through an API) can navigate within the representation to perform a variety of functions. (See step 805 in FIG. 8.) These functions include, for example, navigating to a particular location in the display; progressively examining the detail of the content associated with an object (such as the data collections available on a device); setting up sharing of data content; modifying a user's access control relative to a particular object; configuring aspects of the WVDS; adding devices and collections to be recognized by the WVDS; and invoking the native interface or an object-specific interface provided by the WVDS that is associated with a particular object. In one embodiment of the WVDS, the user can navigate to view different locations in the representation (e.g., by changing a rendering viewport), view the representation from different viewing angles (e.g., by changing camera angles), and can zoom in and out to different levels of perspective, where each level can be configured to present a different level of detail.

A user navigates the connectivity universe presented by the WVDS using an input device, such as a mouse, to control which portion of the universe is currently displayed on the display screen (e.g., a viewing "camera" location/angle) and to control the size of data that is presented on the display screen and potentially how much detail is displayed (e.g., the "zoom" level). (Depending upon how zoom operations are implemented, "zooming" can refer to how big or small objects appear and/or how much detail is displayed.) In a typical WVDS embodiment, zooming is generally performed using smooth animations. In some embodiments, zoom levels or ranges of zoom levels are associated with different levels of perspective, which can be further used, along with other considerations, to define what is presented at different ranges or values of "zoom" levels. When a user zooms in or out to a particular zoom level, the WVDS determines to which level of perspective ("LP") the zoom level corresponds and then uses the determined LP to decide what should be displayed. For example, for some zoom ranges (which may, for example, correspond to a range of distances from a virtual camera to the object(s) at or near the center of the screen), it may make sense for the WVDS to display all of the possible detail that is available to be shown. For example, when the camera is within a certain distance to the object or, using an another metric, close enough so that the object occupies at least a certain portion of the display screen, the user may find it helpful to see all of the detail of the object. For other ranges, such as viewing an entire connectivity universe representation, it may not make sense to display all of the detail associated with all objects. Metrics other than distance from an object and/or portion of a display that is occupied may also be used to associate LP's to zoom levels.

Note that zooming operations can be implemented without levels of perspective, such that all detail that is potentially viewable depending on the object size, distance of the camera from the object, and the resolution of the display upon which the connectivity universe representation is being viewed. Such detail may include, for example, sub-collections, device and collection rings, UI components associated with objects, etc. For example, when the viewing camera is located a certain distance from an object, that object and its associated detail might occupy 100×100 pixels on the display screen. However, when the camera pulls further back away from the object (for example in response to a user zoom out request), then the object will appear smaller and may only occupy, for example, 10×10 pixels on the display screen. If the camera pulls back even further, the object will occupy less of the display screen, even possibly to a point where the object occupies a single pixel and/or perhaps progressing even further to a point where the graphics rendering system determines that the object is too small to display at all (even though logically the object is still there and may appear again when the camera zooms in closer to it). Note that when an object's representation size gets smaller, its associated detail also gets accordingly smaller such that, at certain points, some of that the associated detail has become too small to discern and/or to even occupy a single pixel on the display even though the object itself, being a larger size, is still being displayed and is potentially discernable. In some embodiments, certain associated detail (e.g., object attributes) may retain a constant display size, regardless of zoom level and/or the display size of the associated object, and such constant-size attributes may further optionally be suppressed from being displayed when their associated object becomes too small to be displayed at all. For example, in one embodiment, when the user hovers over an object, the name of the object is displayed at a constant size for easy readability. The particular techniques used to determine the displayed size of objects are dependent upon many factors such as the graphics engine employed, the resolution of the host computer display, the hardware, the operating system, etc.

Other combinations of implementing zoom levels to correspond to one or more levels of perspective are also possible. In any case, the WVDS may be implemented and/or configured to control what is displayed in correspondence to how close-in or far away the user is.

In one embodiment, the WVDS provides the following levels of perspective in increasing order (farthest away to closest):

1. World
 2. Proximity Band
 3. Device
 4. Active Device
 5. Native UI
 6. Collection
 7. Active Collection
 8. Sub-collection
 9. Active Sub-collection
 10. etc. (further levels of sub-collections)

Level 1 represents the outermost level of perspective. For example, in this embodiment, a definition of Level 1 specifies that the entire world is displayed and accessible (to the extent it can be viewed on the device). In Level 2, the focus is on proximity bands. Level 10 represents further inner levels of perspective until there are no more sub collection levels to be displayed or accessed. Level 5 represents zooming in to an object close enough to display the native user interface that is specific to the object or one provided by the WVDS (for example, if the device is not capable of providing access to its user interface from within the WVDS). Thus, when a user accesses a native user interface of an object in the WVDS, the user does so in the context of the user's entire connectivity universe and, by zooming in and out, the user can access different portions of the user's universe.

Depending upon the WVDS configuration settings, the different levels of perspective correspond to transitions in the amount of detail displayed in the connectivity universe representation. According to one WVDS definition, the level of perspective at which device rings are displayed around devices is termed the "device ring display level." In one embodiment, the device ring display level is the Proximity Band level, although it is configurable. In another embodiment, the device ring display level is the World level, and thus device rings are always displayed. The level of perspective at which collections are displayed on the device rings is known as the "collection display level." Typically, this occurs at the Proximity Band level, although, as with all of the other levels, this behavior is configurable. The level of perspective at which sub-collections are displayed on the data collection rings is known as the "sub-collection display level." Typically, this occurs at the Active Collection level, although, as with all of the other levels, this behavior is configurable.

Note that in some embodiments, the levels of perspective may be effectively reduced to a single level of perspective if no transitions between amount of detail or no differences between levels are defined. For example, if all objects are displayed and all functionality is available all (or most) of the time, the zoom in and zoom out behavior of the WVDS user interface may set the viewport and camera angle without necessarily affecting how much or what detail is displayed. Similarly, if a couple or few display detail transitions are described, the WVDS definition may incorporate only a couple or a few levels of perspective.

For example, in one embodiment of a WVDS, all objects are always displayed except that only sub-collections of active devices/collections are shown. When the user activates an object, and, for example, zooms in to a sufficient level, the zoom level may correspond to a level of perspective (e.g., an Active Object LP) that indicates a display transition to display sub-collections of that object. In this example, two levels of perspective are sufficient to define the display characteristics: a level in which (sub-)collections are shown for an active object if any, and one in which they are not shown. If more than one "level" of sub-collections is allowed (for example, nested sub-collections), then additional levels of perspective are incorporated.

In addition, different levels of perspective may be associated with different default WVDS configuration parameters. For example, screen forwarding for device representations that correspond to devices with display screens may default to being turned on at some levels but not for other levels. Considerations such as clutter, performance, and security may be incorporated in determining at which levels screen forwarding makes sense. Other WVDS configuration parameters can similarly be associated with different levels of perspective. In some embodiments, even if these parameters are set as defaults for a particular LP, a user may be allowed to override such settings on a per object basis (a proximity band basis, or a system-wide basis), for example, through a WVDS user interface associated with a particular device object. In addition, the WVDS may use heuristics to automatically determine when certain parameters are set or not.

Figure 18A:
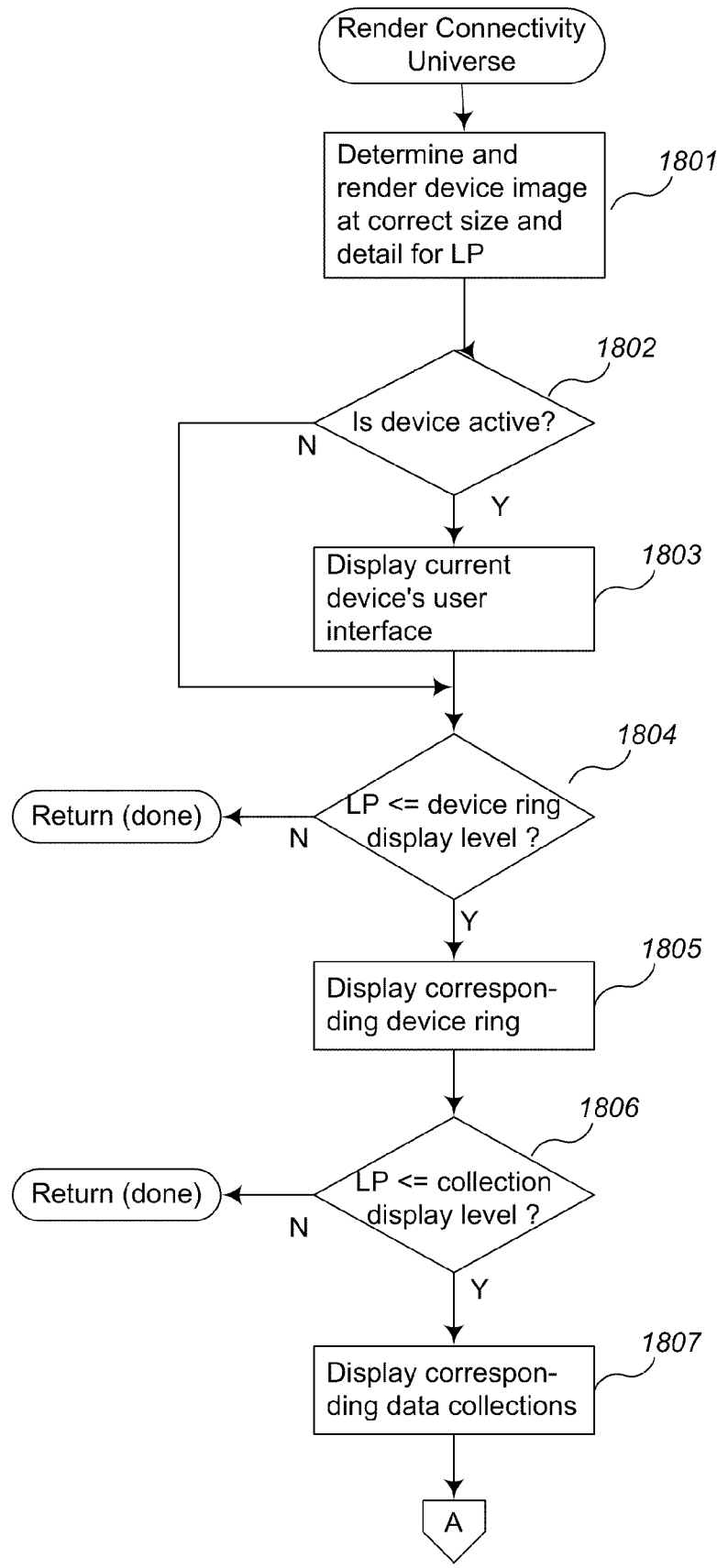
FIGS. 18A and 18B are an example flow diagram of proximity band rendering supported by an example rendering system of a WorldView Display System.
Figure 18B:
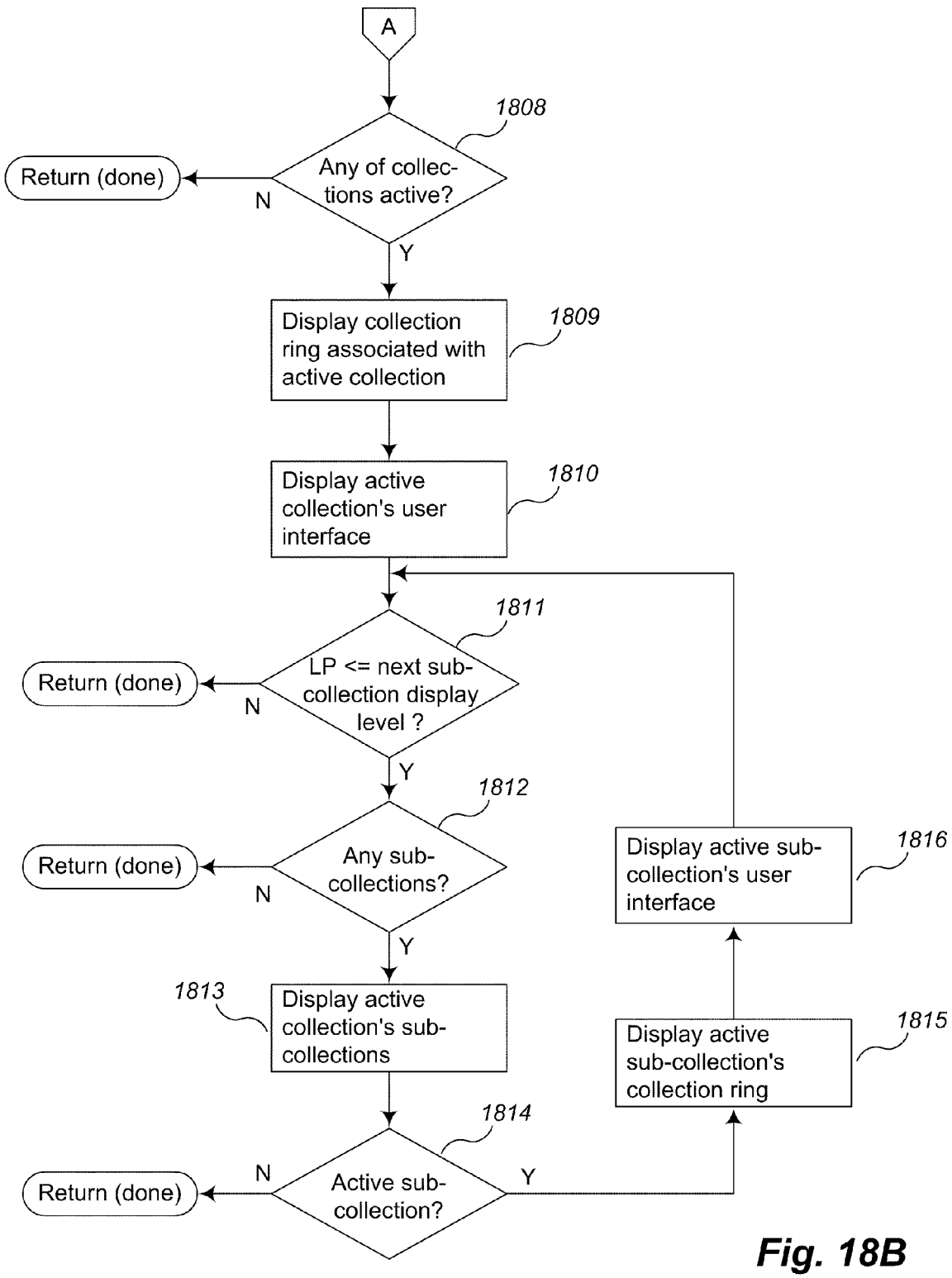

The WVDS renders the objects in the user's connectivity universe based upon the current configuration of these levels of perspective. FIGS. 18A and 18B are an example flow diagram of proximity band rendering supported by an example rendering system of a WorldView Display System. Other steps could be implemented, in different orders, and using different algorithms, yet still achieve the rendering functions of the WVDS. Steps 1801-1816 are executed for each (topmost level) object in each proximity band in the system, appropriate to the current level of perspective. In step 1801, the WVDS determines and renders the device image, size, and detail according to the current level of perspective (LP) and whether the device is active or not. In step 1802, the WVDS determines whether the device is active, and, if so, continues in step 1803, else continues in step 1804. In step 1803, the WVDS displays the active device's WVDS user interface and may also display auxiliary features such as access control information or other information. In step 1804, the WVDS determines whether the current LP is at or below the device ring display level, and, if so, continues in step 1805 to display a corresponding device ring, else returns. In step 1806, the WVDS determines whether the current LP is at or below the collection display level, and, if so, continues in step 1807 to display any corresponding data collections, else returns. In step 1808, the WVDS determines whether any one of the data collections is active, and, if so, continues in step 1809 to display the collection ring associated with the active collection, else returns. In step 1810, the WVDS displays the active collection's WVDS UI and may also display auxiliary features such as access control information or other information. In steps 1811-1816, the WVDS executes a loop for each contained sub-collection to display the sub-collections and their associated sub-collection rings, as well as the active sub-collection's WVDS UI. More specifically, in step 1811, the WVDS determines whether the current LP is at or below the next sub-collection display level, and, if so, continues in step 1812, else returns. In step 1812, the WVDS determines whether there exist any sub-collections to display, and, if so, continues in step 1813, else returns. In step 1813, the WVDS displays the sub-collections. In step 1814, the WVDS determines whether a sub-collection is active, and, if so, continues in step 1815 to display the sub-collection ring associated with the active sub-collection, else returns. In step 1816, the WVDS displays the sub-collection's WVDS UI, and may also display auxiliary features such as access control information or other information, and then returns to step 1811. In one embodiment, only the lowest-level active object displays its UI.

Assuming that, at least at some point, the representation of the connectivity universe is larger than can fit on the display screen, the user controls the portion of the universe displayed by moving the input device to reflect the user's position. According to one embodiment, the input device behaves like a camera view finder. That is, as the user moves (as the input device indicates motion) in a forward direction, the user will see more objects ahead while those objects that were previously closest to the user will move behind the user and fall out of view. Also, as the user moves in a direction so that the user appears to be looking more directly downward (moves the point of view source higher), the user will see more of the top of objects and less of a side view. Similarly, as the user moves to the side, the user will see those objects to that side while objects on the other side fall out of view.

Many different graphics and rendering techniques are available to navigate through a two or three dimensional representation of the connectivity universe displayed on a display device. The following definition describes one user interface to effectuate the camera position, angle, and orientation movements described above. Many equivalent user interface definitions can be similarly incorporated and that different user interfaces can be optimized for different input devices. For example, definitions may be created to support other input devices, such as joy sticks, that can control multidirectional, 3-D movement.

Movement forward, backward, and side-to-side: the user's point of view follows the mouse (or similar input device) movement. This movement changes location, but doesn't change the direction the user is facing.

Changing the view angle: pressing the two main mouse buttons simultaneously and moving the mouse changes the view angle in the direction of the mouse movement. A move right shifts the view to the right; a move left shifts the view to the left; a move forward shifts the view downward; and a move backward shifts the view upward (or visa versa).

Changing the zoom level: rolling the mouse wheel moves the view closer or further from the displayed object(s). Correspondingly, in WVDS definitions with multiple LP's, the level of perspective may change as the zoom level passes from that specified for one LP range/value to another.

These various movements may also be combined by the WVDS to automatically provide the user with useful views. For example, as the zoom level is changed to a closer level (thereby showing more detail), the viewing angle may automatically be changed to provide a more front-on view of the objects.

Figure 19:
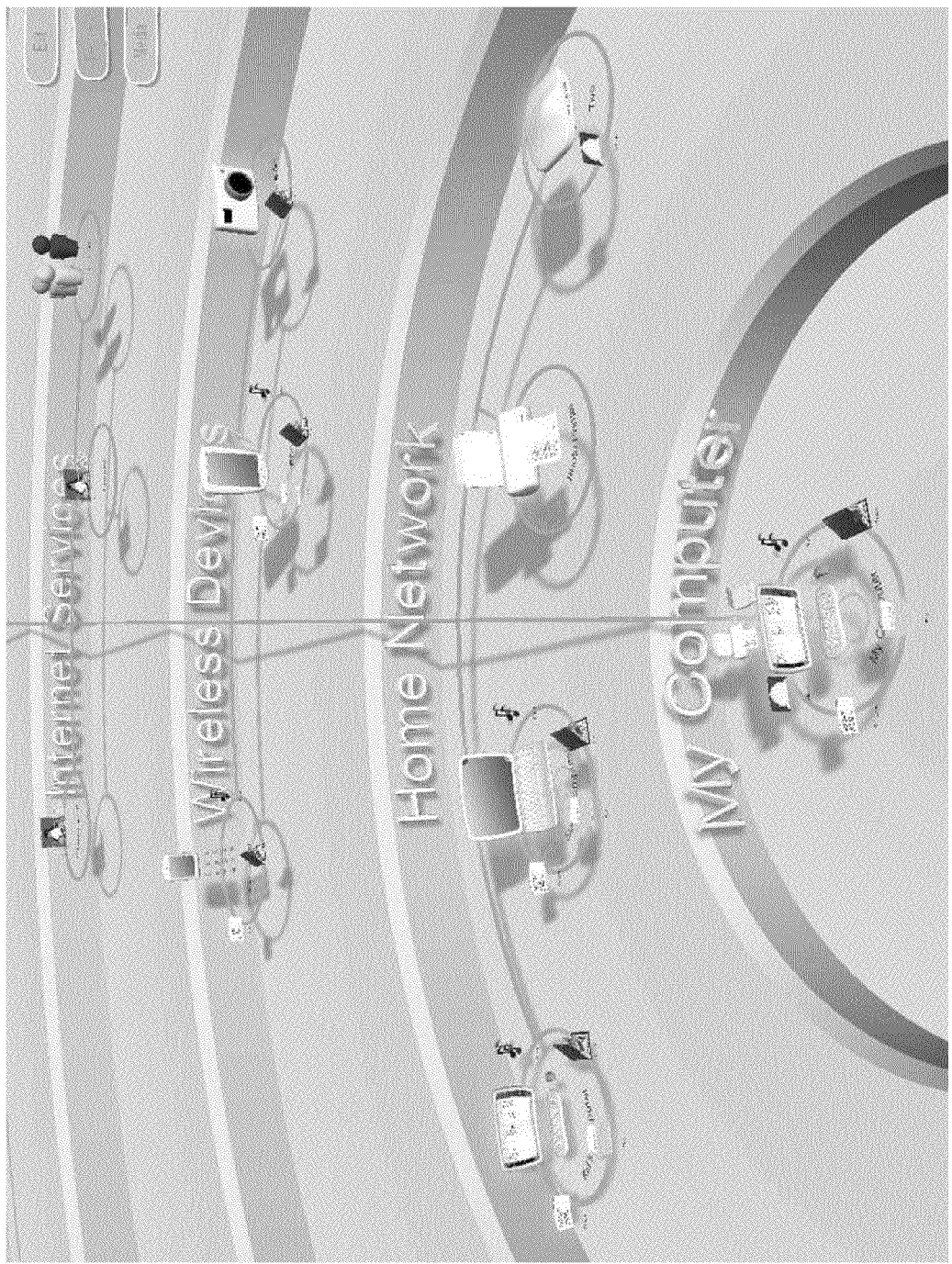
FIG. 19 is an example screen display of a presentation of objects grouped by access proximity as displayed by an example WorldView Display System.

FIG. 19 is an example screen display of a representation of a user's connectivity universe as displayed by an example WorldView Display System after navigating to a new location. In FIG. 19, only some of the proximity bands that represent the entire universe are displayed, the display viewing angle has been changed to appear as if the user is viewing the universe from a position closer to the ground (e.g., the "floor" of the universe) as opposed to further up in space, and the various objects represented in the proximity bands appear larger.

Figure 20:
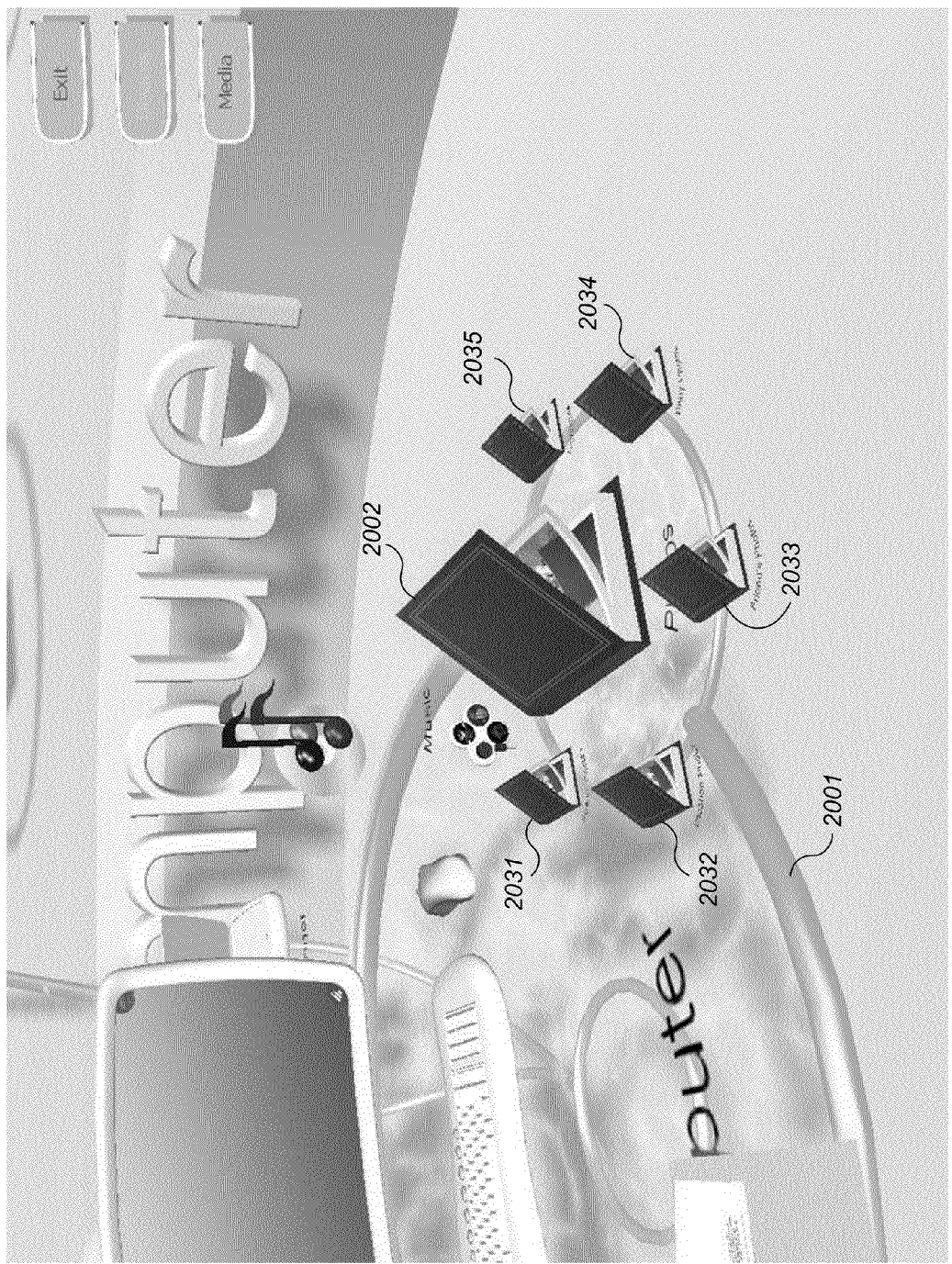
FIG. 20 is an example screen display of an example connectivity universe from a different viewing angle and level of perspective.

FIG. 20 is an example screen display of an example connectivity universe from a different viewing angle and a different level of perspective. In FIG. 20 the user has navigated in such a way that a transition is effected from the Proximity Band level of perspective ("LP") to the Active Collection LP. This transition results in the display of a photo collection 2002, with its sub-collections 2031-2035, on the device ring 2001, which is consistent with a WVDS configuration that specifies the Active Collection LP as the sub-collection display level. In comparison to FIG. 1, the viewing angle has also been changed to reflect a view source that is more level with the object, yielding a perception of traveling down to and facing the object head-on, when the movement is rendered as a smooth animation.

Figure 21:
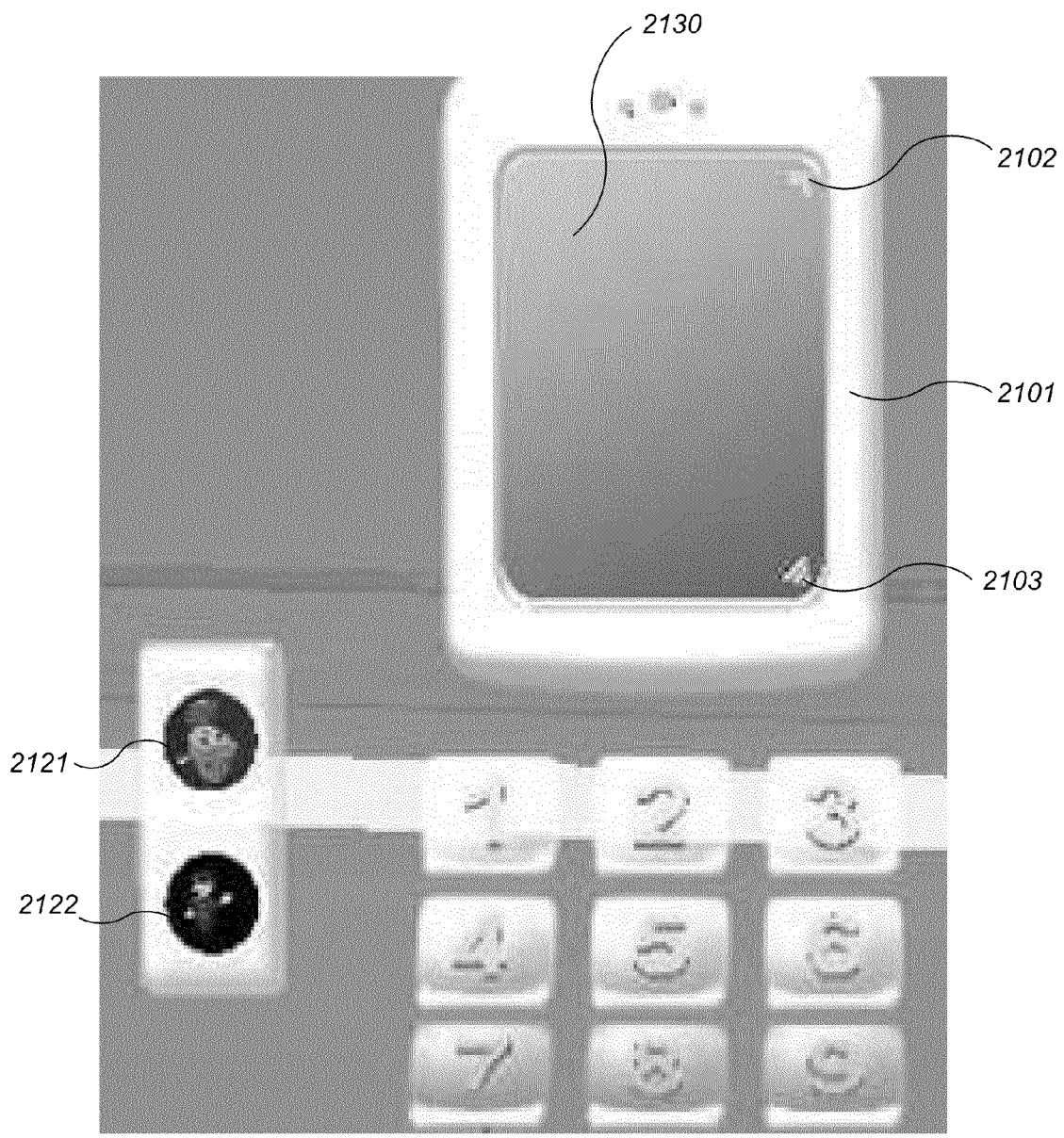
FIG. 21 is an example screen display of a close-up view of a WorldView Display System user interface displayed for an active device.

In addition to general navigation, the user can also further manipulate objects and their content by activating them. As briefly mentioned with reference to FIG. 2, when an object (device/service or data collection) is made active, the WVDS displays a user interface tool for further manipulating the object. FIG. 21 is an example screen display of a close-up view of a WorldView Display System user interface displayed for an active device. The cellular phone device 2101 is depicted with a WVDS UI palette 2120. Palette 2120 comprises two buttons: a "robot" button 2121 for setting up characteristics of the associated device (using the native user interface associated with the device where available) and a "policeman" button 2122 for invoking an access control dialog (e.g., to set up access permissions and potentially other configuration parameters) with the user. The user can also manipulate an active device in other ways. In one embodiment, the user can bring up a user interface (for example, by right clicking on the device with a mouse or by selecting the robot button 2121) to add new collections to be recognizable on the device. In addition, a maximize button 2102 is displayed to allow the user to easily (e.g., in a single click) zoom into a native user interface associated with the device, for example, whatever is currently being displayed on the display 2130 of device 2101. In one embodiment, the maximize button 2102 lets whatever is displayed on the display 2130 of device 2101 "take over" a majority of the screen, such as in a "full screen" mode. For example, if the user (or the WVDS system) has set configuration parameters such that screen forwarding is active for this device, then the display screen 2130 will be currently displaying whatever is being displayed by the native operating system of the associated (real) device. When the device 2101 is maximized, the content being displayed is enlarged accordingly. The user can use zoom handles button 2103 to adjustably zoom into whatever is currently being displayed on the display 2130 of the device 2101, for example, to see more of what is on display 2130 in the context of the connectivity universe. In one embodiment, the zoom handles button 2103 presents a handle which can be dragged by the user to adjust the zoom level while automatically repositioning the viewing "camera" so that the display 2130 remains fully in view. Also, in some embodiments the user can "open" the active device, for example, by double-clicking on the device representation (or through another button) or by single-clicking within the display 2130 to redirect input from the host system to be forwarded to the associated (real) device to be processed by its native user interface, or a WVDS provided one. From the user's perspective, the user then appears to be interacting directly with the real device, especially when screen forwarding is active, and enables the display 2130 to show in near-real time output that results from the user input being processed by the associated device. Other buttons for other capabilities can be easily incorporated and other iconic representations or symbols can be displayed. A more distant view of a UI palette displayed for an active device is shown as palette 230 in FIG. 2.

Figure 22:
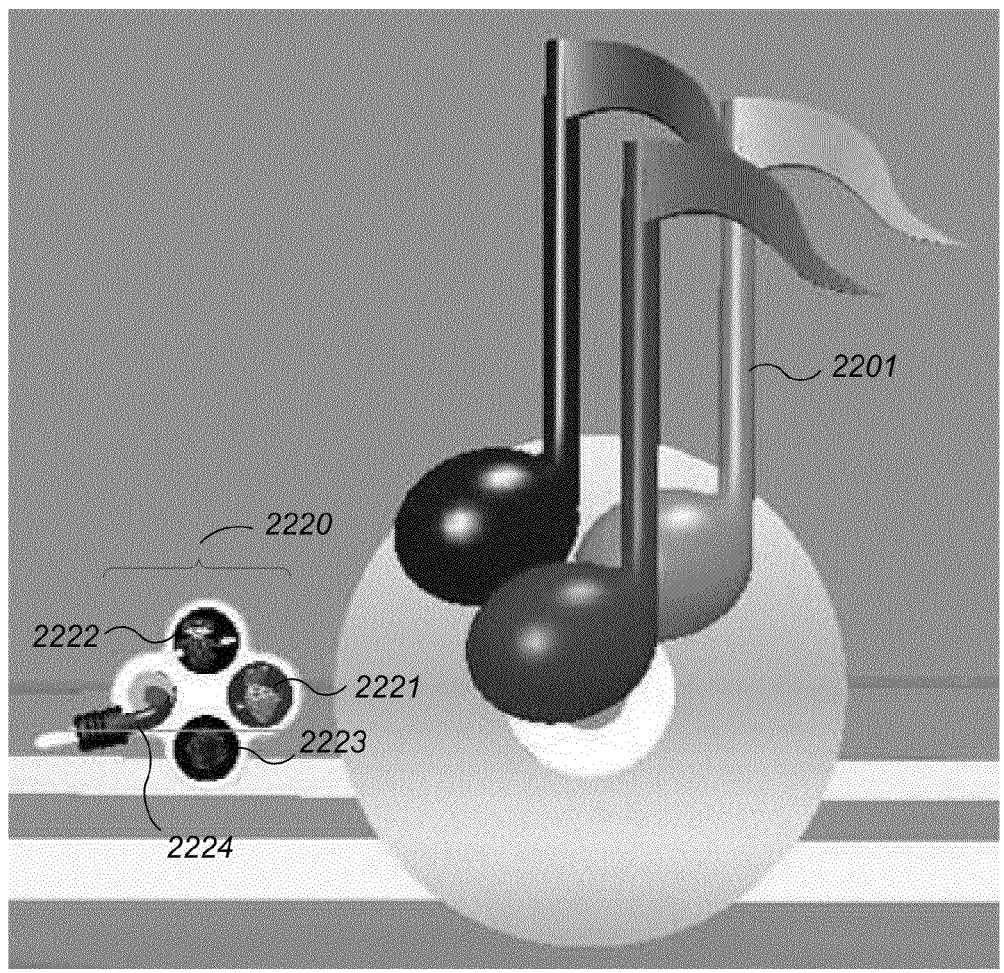
FIG. 22 is an example screen display of a close-up view of a WorldView Display System user interface displayed for an active collection.

FIG. 22 is an example screen display of a close-up view of a WorldView Display System user interface displayed for an active collection. A music data collection 2201 is depicted with a UI palette 2220. Palette 2220 comprises three buttons 2221-2223 and a sync/share interface cable 2224. The buttons include a "robot" button 2221 for setting up characteristics of the data collection, a "policeman" button 2222 for invoking an access control dialog (e.g., to set up access permissions) with the user, and a "rose" button 2223 for opening the data collection using an appropriate media viewer. A further out view of a UI palette displayed for an active data collection is shown as UI palette 340 in FIG. 3.

Other buttons for other capabilities can be easily incorporated and that other iconic representations or symbols can be displayed. For example, in one embodiment, the WVDS supports a uniform "media control" type interface on a data collection for manipulation of the contents of the collection. Media controls includes commands such as a "play" command, "pause" command, a "next" command, a "previous" command, a "fast forward" command, and a "rewind" command, which are supported in the form of buttons or other UI components. The user can invoke these media controls to easily cycle through the data contents of a collection and to invoke the appropriate player/viewer to present the contents.

Using the access control button of either a device or data collection UI palette, for example buttons 2122 or 2222, the user can cause the WVDS to display an access control dialog (not shown) to configure access permissions on the corresponding device or collection to the extent that the user has permission to do so. Setting access permissions from this dialog allows the user to easily specify for one or more users access permissions at the object level, which may be different for each user or group of users, instead of setting them one at a time for other users to whom the user desires to grant access. Alternatively, access control cards can be used to manage access permissions at an individual level. As described above, in one embodiment, access control cards are presented along with an active object's representation (and at other times).

Figure 23:
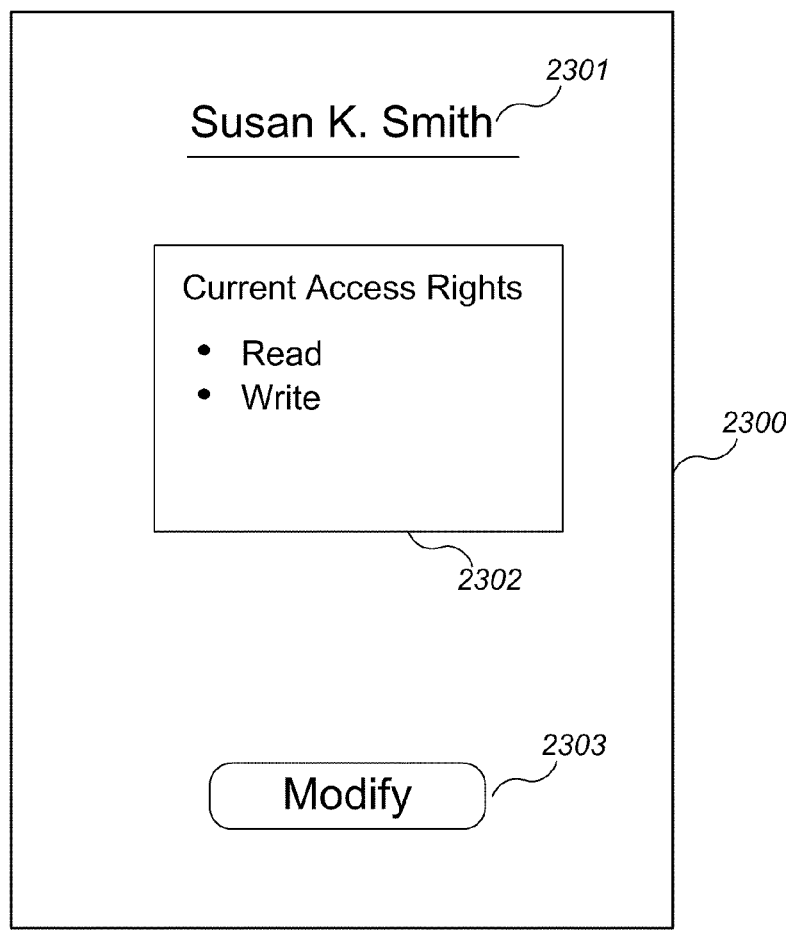
FIG. 23 is an example block diagram of an access control card for configuring access rights of a device or a collection for an individual.

FIG. 23 is an example block diagram of an access control card for configuring access rights of a device or a collection for an individual. Access control card 2300 includes an indication of the user's identification 2301 and an indication of current state of access rights 2302. To change access rights, the user selects the Modify button 2303 (or link or other user interface component as appropriate). Many alternative yet equivalent implementations and presentations exist for setting up access permissions for a device or data collection of a WVDS.

In one embodiment, each access card has a front side and a back side. Once an access control card has been set up for a particular object, the WVDS may be configured to display the current settings on the front side of the card or a symbol of the user (or an avatar representing the user) as part of the representation of the object. In addition, in some embodiments, an access control card associated with a device or data collection may be displayed for each user that has some type of access to the object, resulting in potentially multiple access control cards being displayed at the same time for a single object. Typically, the WVDS displays the (front side of) associated access control cards for active objects. When a user then selects an access control card (to the extent the user's permissions allow), an animation turns the card from the front to the backside, resulting in the card as shown, for example, in FIG. 23. The user can then modify the access permissions for the associated object (for the corresponding user if applicable). For example, in FIG. 2, access control card 240 is displayed as part of the device ring presentation. Similarly, in FIG. 10, access control cards 1020-1022 (one per user) are displayed with corresponding shared collections 1010-1012.

In other embodiments, the WVDS can incorporate other types of settings and/or access control parameters. For example, controls that limit access based upon the type of content or device in combination with certain characteristics of a user, or based upon other limits such as time, may be implemented to effect a parental control interface. Such interfaces can be integrated into the WVDS, for example, as part of the settings or access control buttons available on the WVDS UI palettes, for example, robot button (2121 and 2221 in FIGS. 21 and 22, respectively) or policeman button (2122 or 2222 in FIGS. 21 and 22, respectively), For example, in one embodiment screen forwarding and input device redirection capabilities may be configured using these buttons for particular devices. Many combinations are contemplated, such as defining an initial WVDS configuration definition that generally enables or disables screen forwarding, for example, to allow a user to follow what's happening on multiple devices simultaneously or to reduce clutter, but still allow a user to override these settings on a per object, proximity band, or system-wide basis.

The sync/share interface cable present on a UI palette of a data collection, for example the cable 2224 in FIG. 22, is used to set up a data sharing relationship, which may be synchronized in some manner, between two (or more) collections of data. Two collections have a synchronized data sharing relationship when data is automatically transferred between them as either acquires new or modified data. For example, when a music data collection on the user's My Computer device (on the My Computer proximity band) has a synchronized data sharing relationship set up with a music data collection on the user's portable device (accessible for example, via a Home Network proximity band), then the two collections are automatically synchronized whenever one of them is changed. This functionality is useful in a variety of scenarios, for example, keeping address books and contact lists synchronized between a user's personal computer and cell phone; sharing photos with family members and friends; and sharing photos between a user's personal computer and a portable device such as a PDA. In all such cases, the WVDS, along with the corresponding devices' operating systems, services, applications, etc. as necessary are responsible for synchronizing updated content and no further actions need be taken by the recipient user. Note that in some alternative embodiments, the data may be shared and not automatically synchronized, or such aspects may be configurable.

Data sharing relationships may be one-way or two-way. A one way relationship implies that one data collection serves as a source for data updates and one data collection serves as a target. A two-way relationship implies that each collection acts as a source collection for the other when their respective data content changes and that each collection acts as a target collection (recipient) for the other's changed data content. Thus, the shared data is transferred in two directions and the sharing relationship can be termed bi-directional.

Also, data sharing relationships may involve the actual transfer of data or may involve "virtual" transfers, in which the device associated with the target collection receives a description of the modified data content, but the actual transfer is delayed until a user tries to access it (e.g., the recipient collection may contain a link to the shared source data).

The WVDS also provides a user with an ability to set up "functional agents" at each end of the data sharing relationship. These functional agents provide hooks into code that is executed as appropriate upon the sending or receiving of data by a collection. Many such functional agents can be defined. In an example embodiment, the WVDS supports the following functional agents:

Send New—A basic sending agent that detects when new data is deposited in the associated collection and sends the new data to the other collections that have data sharing relationships with the associated collection.

Filter and Send—A sending agent that detects when new data is deposited in the associated collection and only sends it when the data passes user-configured (or WVDS-defined) filters.

Receive and Store—A basic receiving agent that detects when new data is received and stores it in the associated collection. The agent is responsible for storing the received data in local storage associated with the device that corresponds to the receiving collection (or other data repository) and adjusting any records that define the receiving collection's content.

Receive and Filter—A receiving agent that detects when new data is received and only stores it (and updates appropriate records) when the data passes user-configured (or WVDS-defined) filters.

Receive and Display—A receiving agent that detects when new data is received and displays it.

Receive and Notify—A receiving agent that detects when new data is received and notifies the user that the data has been received. The type and location of the notification can be configured by setting corresponding WVDS parameters.

In one embodiment, data sharing relationships are established by connecting (such as by dragging or using other direct manipulation input commands) a representation of a sync/share cable from a source collection or device onto a target collection or device. More specifically, the user drags a "sharing cable" with a plug within the displayed universe (using other navigation commands as appropriate) and "plugs" the cable plug into a "receptor" on a target data collection or device by, for example, a drop movement. Upon plugging in the sharing cable, the WVDS automatically establishes a (typically) synchronized data sharing relationship between a corresponding source data collection and a (direct or implied) target data collection. Optionally, a sharing "settings" configuration dialog or a confirmation dialog may be displayed before completing the connection. In one embodiment that utilizes a mouse, when the user clicks on a sharing cable plug, the mouse can be used to drag the cable (which is pulled out from the collection/device as needed to follow the mouse around) without depressing any buttons. (The WVDS accomplishes this functionality by implementing modal operation when the mouse is used to click on the cable plug.) The user is thus able to use full navigation commands, including zooming to find an appropriate target collection. While a cable is being dragged, appropriate candidate target collections may be highlighted or otherwise given emphasis (or devices when the level of perspective or zoom level is too far away to present collections). In some embodiments, inappropriate targets are dimmed. When the cable plug nears a candidate collection, the candidate collection may display a receptor or other target indicator to indicate to the user that the cable can be attached to that collection. A further mouse click or other type of selection indication by the user on the receptor or other target indicator may be used to indicate that a connection should be made with the target collection.

Devices can also display receptors when a cable plug comes near them. Even though data sharing relationships are ultimately established between data collections, the WVDS will automatically attempt to set up a relationship between corresponding types of data collections when the user specifies a device as either the source or target of a drag operation of a sharing cable. For example, when the user drags a cable from a collection to a target device, the WVDS creates a data sharing relationship between the source collection and a collection of the same type on the target device. If there is more that one collection of that type on the device, then the user is queried to determine the desired target. If there are no collections of that type yet on the device, then a new collection is created.

Both data collections and devices can include sharing cables with plugs. For example, the sync/share interface cable 2224 in FIG. 22 is an example sharing cable with a plug associated with a data collection. Similarly, a sync/share interface cable 220 in FIG. 2 is an example sharing cable with a plug associated with a device. When a sharing cable plug of a device is plugged into a receptor of a target data collection, then a matching type of data collection on the source device is presumed to be the source data collection for the data sharing relationship. Again, if there is more than one possible match, the user is queried to determine the intended source. When, instead the sharing cable plug of the device is plugged into a receptor of a target device, then, the WVDS queries the user to specify which collections on the source and target devices should be shared and sets up new collections on the target device if they are non-existent.

Data sharing relationships also may be set up between an external source object to which the user has limited current access rights (the user can access data from the object and is not currently viewing the object within the WVDS display) and a target object to which the user has access rights and which is being displayed in the current WVDS representation. The WVDS will display an appropriate indication to show that data for the data sharing relationship is coming from an external object. For example, the WVDS may display a cable representation that appears to go "off-screen" with a terminator that indicates the source of the data. A corresponding data sharing relationship can be set up with an external object as the target object and an appropriate indicator displayed to indicate that data sharing relationship.

When a data sharing relationship is established, the WVDS may present a user interface to allow the user to configure the parameters and settings of the relationship, including whether the relationship is one-way or two-way (uni- or bi-directional), parameters such as frequency of updates, desirability of virtual transfers, etc., and the specification of special functional agents.

Figure 24:
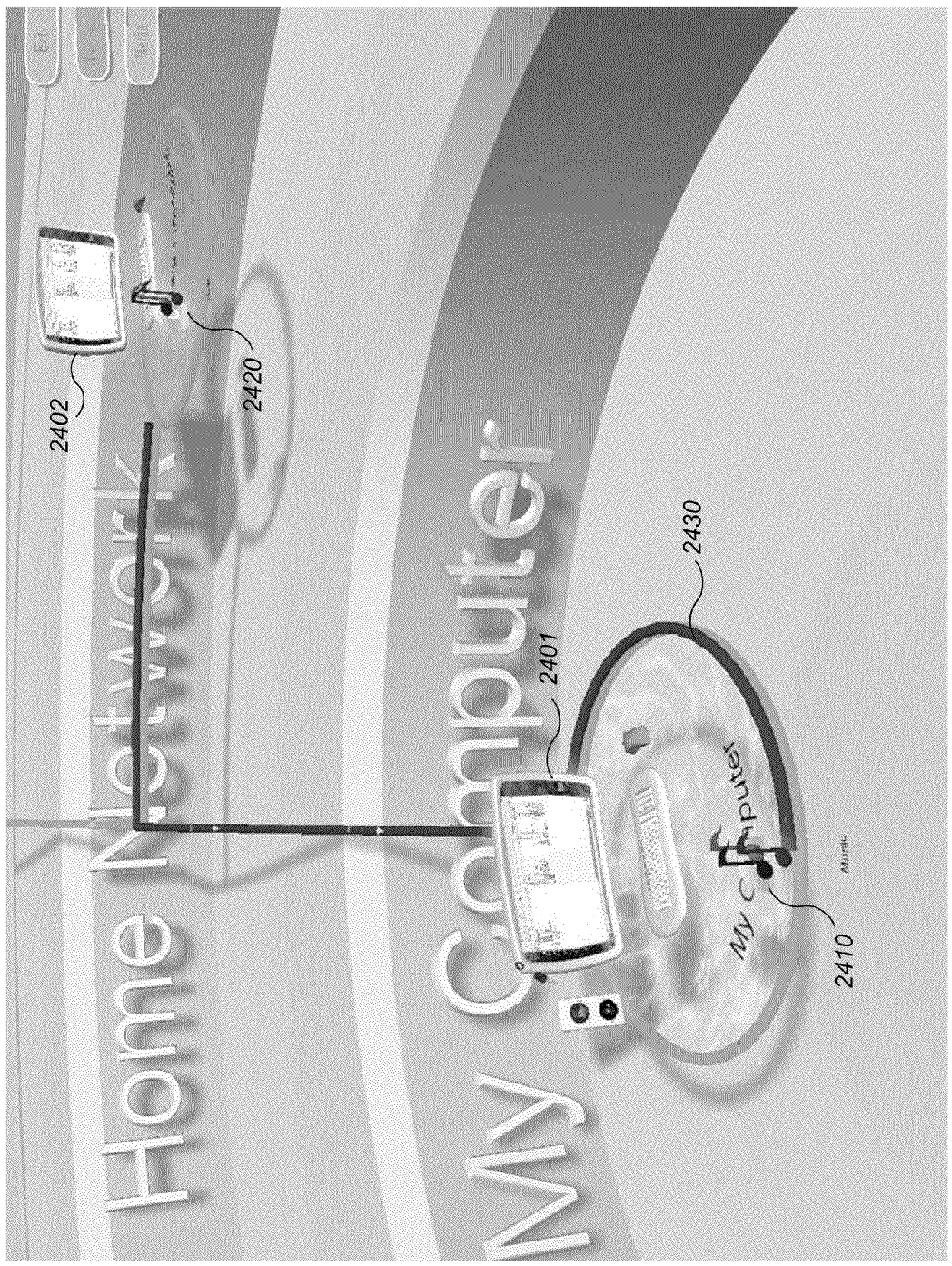
FIG. 24 is an example screen display of a data sharing relationship established between two collections.

Once the relationship is fully established and configured, in one embodiment, the WVDS indicates the data sharing relationship graphically on the presentation of the connectivity universe, for example, using a colored cable between the relevant collections. FIG. 24 is an example screen display of a data sharing relationship established between two collections. In FIG. 24, a data sharing relationship has been established between a music data collection 2410 on a device ring that surrounds the computer system 2401 and a music data collection 2420 on a device ring that surrounds a different computer system 2402 in a different proximity band. Colored cabling, for example, the red cabling 2430, is added between the two collections with the data sharing relationship.

One of the functions available through the WVDS interface is to allow a user to invoke the native interface (or WVDS provided object-specific interface) associated with a particular object within the context of the WVDS. When a device is active, the user can cause input from an input device (for example, a mouse or keyboard) to be "redirected" to the active device, such as by "opening" the active device (by maximizing it or clicking within the device screen) as described with reference to FIG. 21. The WVDS can display an appropriate simile of an input device if the host's input devices aren't appropriate for indicating input to the active device. For example, if the host device is a computer system and the active device is a cell phone the WVDS can display a representation of a cell phone keypad for entering input to the cell phone.

In addition, if screen forwarding is also turned on for the active device, then, when device input is redirected to the active device, updates to the display screen of the associated real device, potentially based upon the redirected input, are automatically displayed in the WVDS device representation. For example, in one embodiment of the WVDS, a device's display screen as modeled by the WVDS (for example, the display screen of the computer system 201 in FIG. 2) is generally always "live." That is, a (typically smaller) replica of whatever the native operating system interface is outputting to the display screen associated with the real device is reflected in the device representation provided by WVDS through its screen forwarding capabilities. As the output to the display screen associated with the real device changes, these changes are automatically reflected in the device representation provided by the WVDS. (The user is thus viewing what is displayed on the actual device in the context of the user's connectivity universe.) By using both screen forwarding and input redirection, a user can interact with native interfaces of devices from within WVDS without leaving the WVDS environment. Note that one can use input redirection without screen forwarding and visa versa—the behavior of an object is dependent upon the WVDS configuration settings associated with that object.

In addition to interacting with the native UI of a device within the connectivity universe representation, the user can zoom in closer to a device until the device's native UI becomes "full screen" (e.g., maximized) on the host device's display screen. The standard navigation techniques for zooming and/or changing levels of perspective (e.g., rolling a mouse wheel to zoom in and out, using a zoom handles button, etc.) can be used to accomplish this function. In addition, on device representations with which a user can interact in full screen mode, the user is able typically to select an area within the device representation display screen (e.g., a maximize button)—effectively zooming in (and/or changing the level of perspective where appropriate) to "maximize" the interface shown on the device representation display screen. In some embodiments, a maximize operation automatically causes input redirection. For example, as shown in FIG. 21, the user can click on the maximize button 2102 as a shortcut to zoom into the native user interface associated with the represented device and display the device's native UI "full screen" on the host device's display screen while also redirecting input to the device. In other embodiments, a user needs to explicitly invoke the underlying user interface associated with the device by causing input redirection through some explicit action. In addition, in some embodiments, when an appropriate user interface component is selected, the WVDS provides a gradual and smooth "zoom transition" from the current zoom level to a full screen (zoomed in or "maximized") view. The zoom transition animates the zooming in action in a manner that allows a user to easily see and understand the transition as the view shifts from a broader connectivity universe view to the selected device screen view. In some embodiments, the WVDS also supports an adjustable zoom handle(s) for changing the size of what is displayed so that more or less of the content displayed on the device can be shown. For example, the user can select the zoom handles button 2103 to invoke an adjustable zoom into the display screen content.

Once the user has maximized a device representation so that the user is viewing only the native UI of the device's underlying operating system (and similarly when the user wishes to enter the WVDS initially from a device's native user interface), the user can enter (or return to) the WVDS connectivity universe representation by selecting a "WVDS Restore" button or other user interface component superimposed on (or otherwise integrated with) the native UI's display presentation. The specific user interface component added to each device's native user interface to accomplish this restore functionality typically depends upon the type of device, its native user interface, and the operating system of the device. If the device is a Window's operating system driven device, then, for example, the WVDS can add a WVDS Restore button on each window's title bar that invokes a type of "restore" function to render the window(s) containing the native UI to a smaller replica of the window(s) within the connectivity universe representation.

In some embodiments, when an appropriate user interface component is used to invoke the "restore" functionality, the WVDS gradually and smoothly zooms out from the full screen display to a higher (further away) level of perspective, which presents the device within the context of the user's connectivity universe representation. This "zoom out" transition animates a zoom out action in a manner that allows a user to easily see and understand the transition as the view shifts to a broader connectivity universe view. In some embodiments, when a device's screen representation is restored, input is automatically redirected from the device to the WVDS.

Figure 26A:
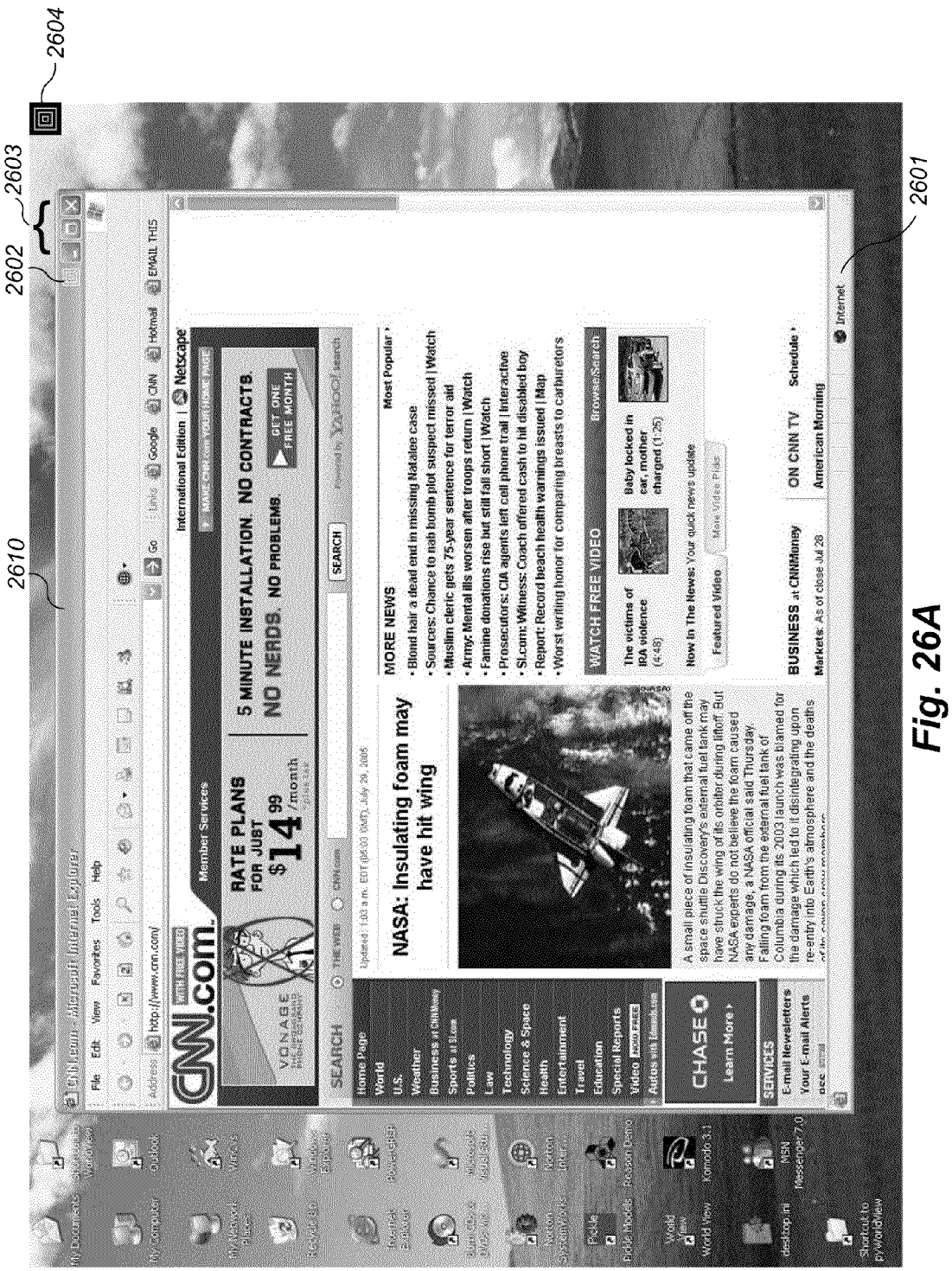
FIGS. 26A-26F is an example display screen sequence illustrating navigation into the WorldView Display System from a native operating system user interface.

FIGS. 26A-26F is an example display screen sequence illustrating navigation into the WorldView Display System from a native operating system user interface. The sequence is demonstrated for transitions between the WVDS and a Microsoft Windows operating system desktop user interface; however, similar sequences and user interface components can be integrated for other operating system UIs as appropriate. In FIG. 26A, window 2601 is shown with the Windows desktop. The title bar 2610 of window 2601 includes a WVDS "restore" button 2602 to the left of the normal Window's title bar minimize, maximize, and close buttons 2603. An additional restore button 2604 is placed in the corner of the Windows desktop. The restore buttons 2602 and 2604 operate as described above to zoom out to the WVDS representation of the user's connectivity universe.

Figure 26B:
Figure 26C:

As described, this zoom out can be presented as a gradual and smooth transition out to the WVDS representation. FIGS. 26B-26F are snapshots of moments in such a transition. In FIG. 26B, the window 2601 is now shown within a WVDS display screen representation 2620 associated with the device that was presenting the Windows desktop in FIG. 26A. As such, the screen representation 2620 contains zoom handles button 2605 and maximize button 2606. In FIGS. 26C-26F, the window 2601 is shown as a progressively smaller replica within WVDS screen representation 2620. Again, the zoom handles button 2605 and maximize button 2606 continue to be present. In FIG. 26C, one can begin to see several of the proximity bands of the connectivity universe representation, which become more apparent by FIG. 26E.

Figure 26D:
Figure 26E:
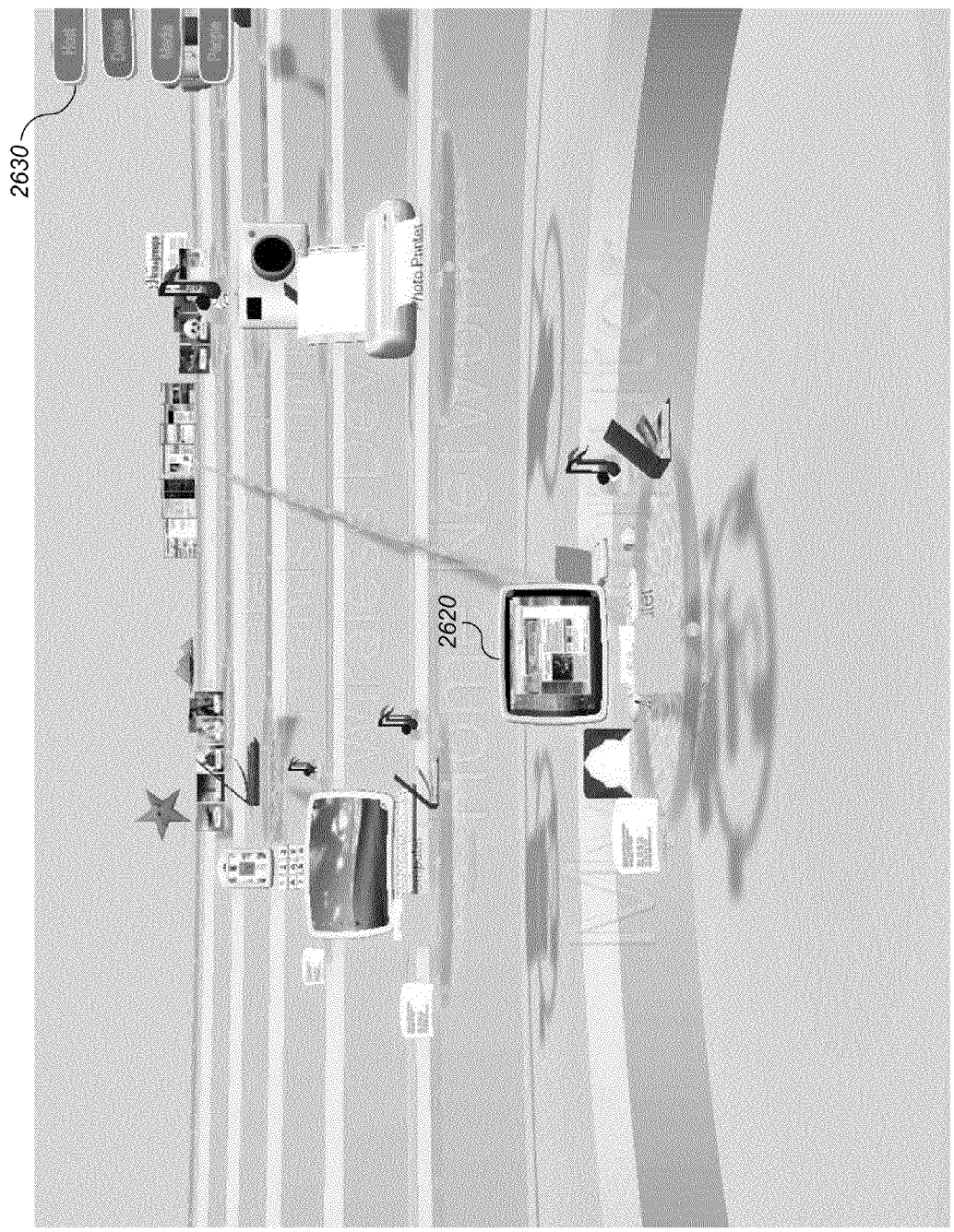
Figure 26F:
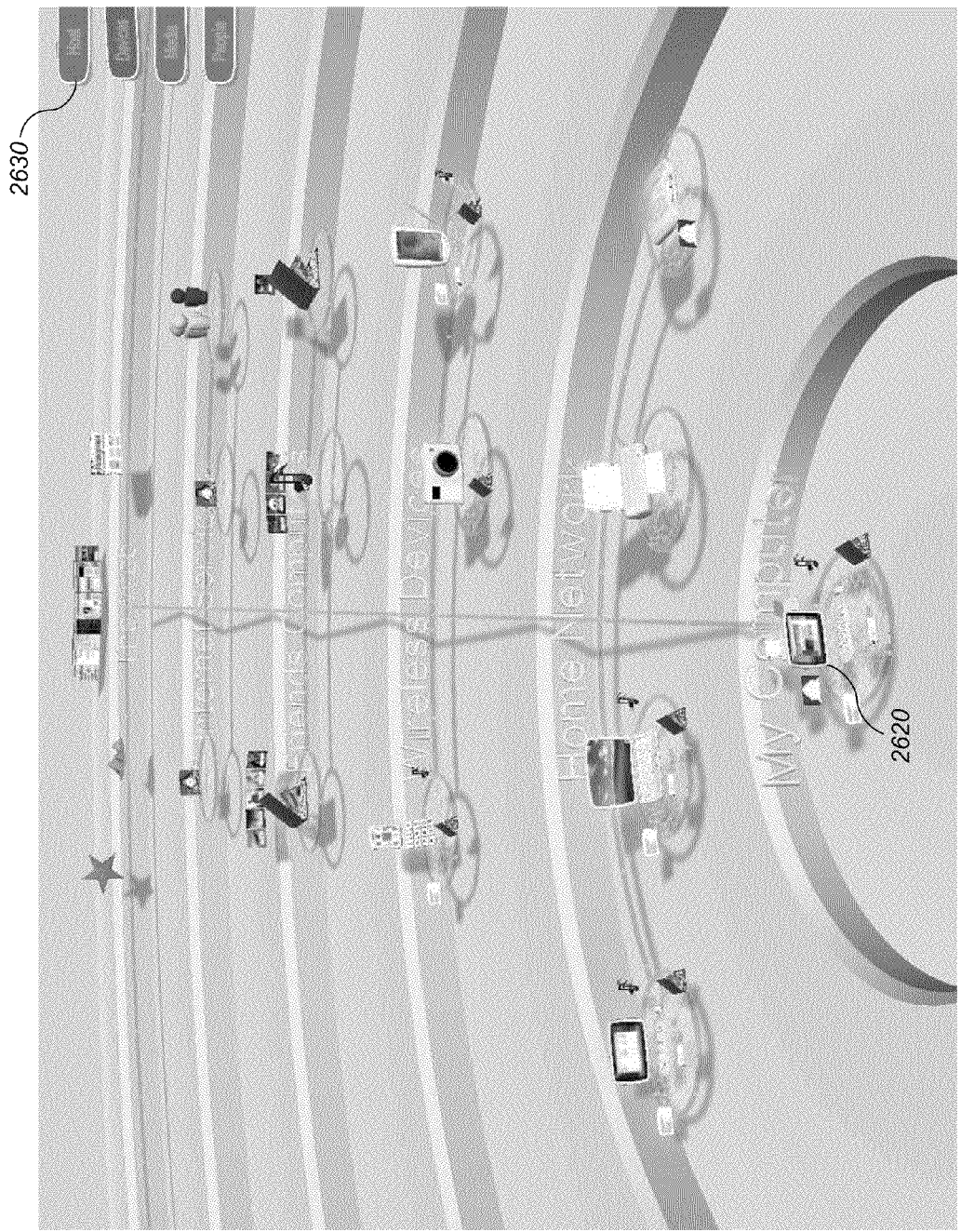

In FIG. 26D, window 2601 shown within WVDS screen representation 2620 is shown in the context of a device ring 2640 associated with the device. In the example shown, this device ring 2640 is the same as device ring 210 shown as part of the My Computer device 201 in FIG. 2. In FIG. 26E, additional zooming out has taken place. By FIG. 26F, the sequence has zoomed out to display all of the proximity bands, thus placing the user in the context of the user's connectivity universe representation. The camera viewing angle has also been changed to view the universe from above so that the bands can be seen more easily. Other sequences, progressions, viewing angles, etc. can be presented to effect the zoom in/zoom out smooth transitions.

The sequence of FIGS. 26A-26F is executed in reverse to return to full screen (or "maximized") mode of the screen representation 2620 associated with the host device (or similarly, to return to full screen mode of other devices). In the illustrated sequence, a host button 2630 is available to quickly return to a full screen view of the host device screen representation using a gradual smooth zoom in transition capability. In some embodiments, for example, when the WVDS is executed as a separate application, this button may operate (and be labeled) as an "exit" button that returns to the user interface of the native operating system of the host device.

In some embodiments, a user can easily switch between interacting with a represented device's native user interface and the WVDS user interface by selecting an area (e.g., using a mouse click) within the device's screen representation in WVDS or outside the device's screen representation in WVDS. For example, if input is currently being redirected to the device's native UI, then, when the user clicks on an area outside of the device's screen representation (other than on a representation of a keyboard or other input device simile displayed by WVDS for the purpose of redirecting input), then WVDS interprets the click and input that follows as intended for the WVDS and not for the device. If, however, a device's WVDS screen representation is maximized, then the user cannot click outside of the screen representation, and employs other techniques to send subsequent input to the WVDS, such as by restoring the display as described above, which in some embodiments will automatically redirect input back to the WVDS. Conversely, if the user clicks on an area inside of the device's (non-maximized) WVDS screen representation, then the WVDS interprets the click as a command to send subsequent input to the device (and some indication of the redirection is typically displayed).

The WorldView Display System also supports the ability for a user to "open" a collection to invoke a native user interface associated with the collection. The "rose" (open)

button in an active data collection's UI palette (see, for example, button 2223 in FIG. 22) can be selected to open the underlying content using an appropriate media viewer. When the user selects the open button, the WVDS directs the host device's operating system to execute the host system's default application for displaying (or otherwise presenting) the active collection's content. For example, if the user opens an active music collection, then the default media player for presenting music is activated as playing the designating collection of music. Similarly, if the user opens an active photo collection, then the default photo viewer is invoked and displays the designed photos. In other embodiments, different techniques that incorporate the native UI of the associated device also may be used and the WVDS can allow the user to choose among available techniques.

As mentioned with reference to FIGS. 21 and 22, the UI palettes presented on active devices and collections also provide users an ability to change settings of the corresponding device or collection. Many different functions can be made available through such an interface, including using the settings button (or a UI component presented in a further response) to invoke a native UI that corresponds to the active device. This native UI can also be presented in a "full screen" mode, as described with reference to opening and maximizing an active device to invoke its native UI. In addition, the WVDS can select between using a native UI to configure the active device or collection and using WVDS specific interfaces. Combinations between them are also possible.

In addition to the operations and functions described, the WVDS can offer many additional enhancements. For example, the WVDS may also support a general "settings" user interface, accessible from a button or other component on the screen for configuring devices, collection types, and other WVDS configuration parameters. Such an interface can be used, for example, to configure the modeling parameters of the WVDS; configure thresholds such as the maximum number of proximity bands to display at certain levels of perspective; hide and unhide the display of particular proximity bands; set up characteristics to assess access proximity; map access proximity classes to proximity bands; specify that particular devices are mapped to particular proximity bands; specify collections on devices, etc. Lots of alternative interfaces to these functions can also be easily incorporated and are contemplated to operate with the techniques described herein.

Figure 25:
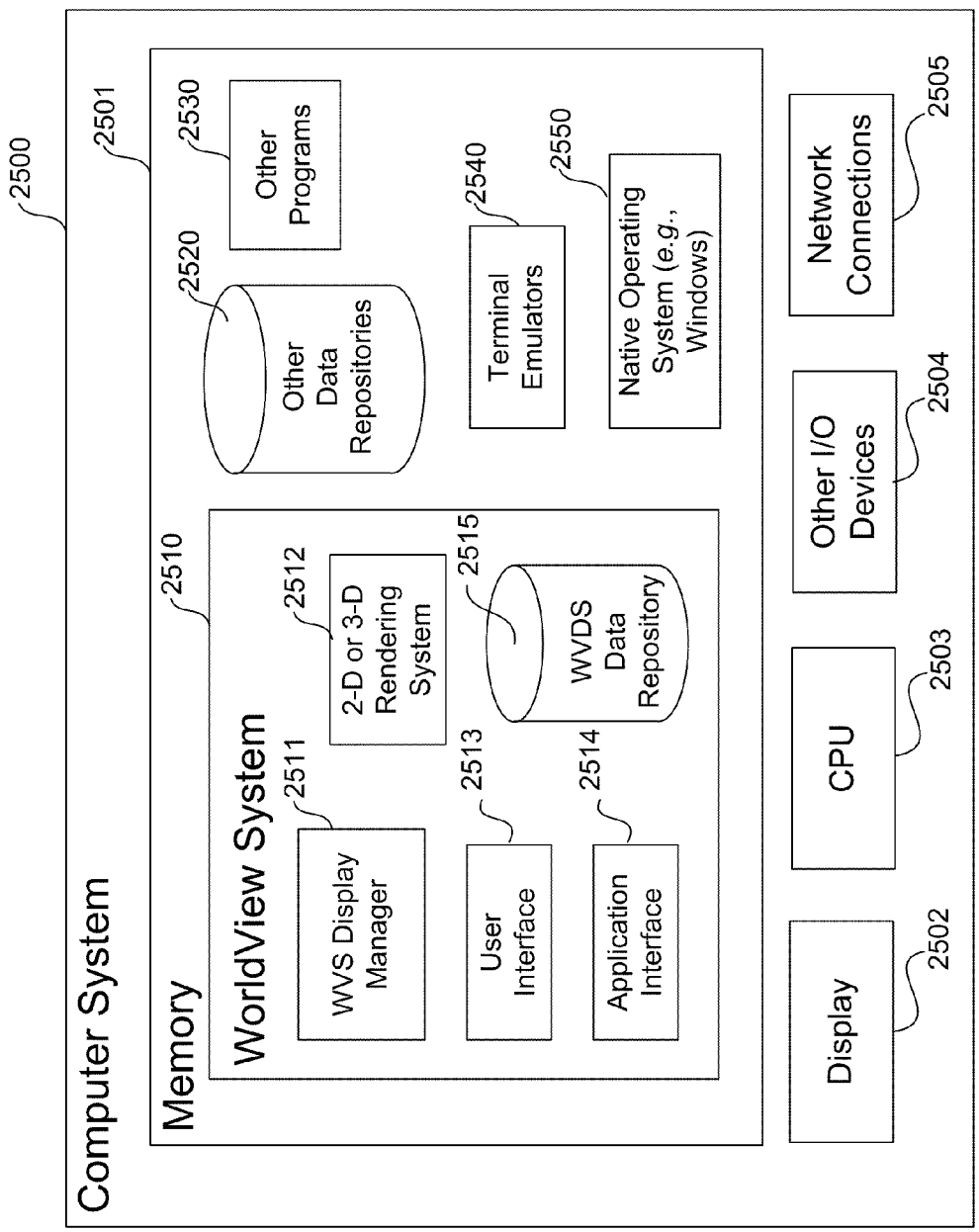
FIG. 25 is a block diagram of a general purpose computer system for practicing embodiments of a WorldView Display System.

FIG. 25 is a block diagram of a general purpose computer system for practicing embodiments of a WorldView Display System. The general purpose computer system 2500 may comprise one or more server and/or client computing systems and may span distributed locations. In addition, each block shown may represent one or more such blocks as appropriate to a specific embodiment or may be combined with other blocks. Moreover, the various blocks of the WorldView Display System 2510 may physically reside on one or more machines, which use standard interprocess communication mechanisms to communicate with each other.

In the embodiment shown, computer system 2500 comprises a computer memory ("memory") 2501, a display 2502, a Central Processing Unit ("CPU") 2503, Input/Output devices 2504, and Network Connections 2505. The WorldView Display System ("WVDS") 2510 is shown residing in memory 2501. The components of the WorldView Display System 2510 preferably execute on CPU 2503 and manage the generation and use of connectivity universes, as described in previous figures. Other downloaded code 2530, terminal emulators as required 2540 and potentially other data repositories, such as data repository 2520, also reside in the memory 2501, and preferably execute on one or more CPUs 2503. In addition, one or more components of the native operating system for the computer system 2550 reside in the memory 2501 and execute on one or more CPUs 2503. In a typical embodiment, the WVDS 2510 includes one or more Display Managers 2511, at least one Rendering Engine 2512, user interface support modules 2513, API support 2514, and WVDS data repository 2515, which contains for example WVDS configuration and connectivity universe information.

In an example embodiment, components of the WVDS 2510 are implemented using standard programming techniques, including object-oriented techniques as well as monolithic programming techniques. In addition, programming interfaces to the data stored as part of the WVDS can be available by standard means such as through C, C++, C#, and Java API and through scripting languages such as XML, or through web servers supporting such. The WVDS data repository 2515 is preferably implemented for scalability reasons as a database system rather than as a text file, however any method for storing such information may be used.

The WVDS 2510 may be incorporated into a distributed environment that is comprised of multiple, even heterogeneous, computer systems and networks. For example, in one embodiment, the Display Manager 2511, the Rendering Engine 2512, and the WVDS data repository 2515 are all located in physically different computer systems. In another embodiment, various components of the WVDS 2510 are hosted each on a separate server machine and may be remotely located from the tables which are stored in the WVDS data repository 2515. Different configurations and locations of programs and data are contemplated for use with techniques of the described embodiments. In example embodiments, these components may execute concurrently and asynchronously; thus the components may communicate using well-known or proprietary message passing techniques. Equivalent synchronous embodiments are also supported by an WVDS implementation.

The capabilities of the WVDS described above can be implemented on a general purpose computer system, such as that described with reference to FIG. 25, using well-known programming techniques.

For example, as described above, one capability of the WVDS interface that is available to a user once the connectivity universe is presented is to allow a user to interact with a native user interface associated with a represented device. In one embodiment, the WVDS supports the ability to "open" an active device, thereby enabling the user to send (redirect) input to the active device. In other embodiments, the WVDS supports the ability to "open" (and redirect input to) any device, regardless of whether it is active or not. In addition, the WVDS supports the ability to forward screen output from a native interface of a represented device to a device representation (whether or not the device is "active"—depending upon the WVDS configuration settings). The manner in which the WVDS can implement a native user interface mode of a device that supports combinations of input redirection and screen forwarding is device, and its underlying operating system, dependent.

Some devices and their native operating systems may support drawing directly to a window specified by the WVDS on the host computer display. In situations in which the WVDS doesn't need to process the output, for example when native device output is presented in full screen mode, the WVDS may, depending upon, for example, configuration settings, provide such a window and the represented device can directly draw to it. However for other devices, and in situations where the WVDS desires to process the output, for example when the WVDS is configured to support rendering, in which displayed content is sometimes rotated, other techniques are incorporated. For example, in one embodiment, the WVDS requests the operating system of the host device to execute a terminal emulator for communicating between the WVDS and the particular device to which input is being directed and/or from which output is being received. The WVDS also invokes a corresponding host software routine (code) on the particular device's native operating system for communicating with the terminal emulator that is executing on the host device. (The device terminal emulator on the host device thus communicates with the host software routine on the particular device.) When input redirection is enabled, input received by the WVDS host input devices is passed to the terminal emulator, which forwards the input to the corresponding software routine on the particular device. When screen forwarding is enabled, screen updates (output) that originate on the particular device are then passed from the corresponding software routine to the terminal emulator executing on the host device, which are then forwarded through to the WVDS to render them on the display screen representation of the device representation that corresponds to the particular device. (When the device representation is full screen, the terminal emulator may be able to write directly to a WVDS display "window" thus expediting screen updates.) Other alternative implementations are possible.

Some devices, for example, currently cameras, do not support even terminal emulation capabilities. In such cases, if there are no alternatives for interacting with the native UI of a device, then the WVDS may disable this function for that device or offer an alternative user interface.

The user can also "open" an active collection to invoke a native user interface associated with the collection. In one embodiment, when the collection resides on the host device, the WVDS directs the host device's operating system to execute the default application for displaying (or otherwise presenting) the active collection's content. When the collection resides on a device other than the host device, the WVDS may direct the host device's operating system to execute the default application for displaying (or otherwise presenting) the active collection's content or may use terminal emulation techniques as described above, or other means of communicating with the native UI of the device associated with the collection, to present the designated collection.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 60/562,848, entitled "A METHOD AND SYSTEM FOR MANAGING PERSONAL NETWORK RELATIONSHIPS," filed Apr. 16, 2004, U.S. Provisional Patent Application No. 60/566,507, entitled "A METHOD AND SYSTEM FOR MANAGING PERSONAL NETWORK RELATIONSHIPS," filed Apr. 29, 2004, U.S. Provisional Patent Application No. 60/630,764, entitled "A METHOD AND SYSTEM FOR MANAGING PERSONAL NETWORK RELATIONSHIPS," filed Nov. 24, 2004, and U.S. application Ser. No. 11/109,488, entitled "MODELLING RELATIONSHIPS WITHIN AN ON-LINE CONNECTIVITY UNIVERSE," filed Apr. 18, 2005, are incorporated herein by reference, in their entirety.

From the foregoing it will be appreciated that, although specific embodiments have been described herein for purposes of illustration, various modifications may be made without deviating from the spirit and scope of the invention. For example, the methods and systems for performing presentation and rendering discussed herein are applicable to other architectures other than a Microsoft Windows operating system architecture. The methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A computer-implemented method for modeling a connectivity universe comprising:
   determining a connectivity universe for a user, the connectivity universe having objects comprising one or more physical devices, logical devices, and/or data collections, each object associated with the user via one or more on-line relationships over one or more computer networks;
   automatically determining a plurality of objects from the objects of the connectivity universe of the user and an assessment of access proximity relative to the user for each such object, the access proximity for at least one of the determined plurality of objects being different for different users;
   automatically grouping the determined plurality of objects into a plurality of groupings based upon the determined assessments of access proximity relative to the user, each grouping associated with a different class of access proximity; and
   displaying, in a unified view, a graphical representation of the automatically determined groupings and their respective objects.

2. The method of claim 1 wherein the automatically determined plurality of objects comprise a plurality of devices.

3. The method of claim 1 wherein the automatically determined plurality of objects comprise a plurality of data collections.

4. The method of claim 1 wherein the determined assessment of access proximity is based upon physical proximity to the user.

5. The method of claim 1, the displaying the graphical representation of the automatically determined groupings further comprising:
   determining a layout of the plurality of groupings relative to the different classes of access proximity; and
   displaying a representation of the automatically determined grouping according to the determined layout.

6. The method of claim 1, the displaying the graphical representation of the determined objects further comprising:
   displaying a plurality of proximity bands.

7. The method of claim 6, the displaying the plurality of proximity bands further comprising:
   displaying at least one proximity band that depicts at least one media collection of at least one type.

8. A non-transitory computer-readable memory medium containing instructions that, when executed, control a computer processor to model a connectivity universe, by performing a method comprising:
   determining a connectivity universe for a user, the connectivity universe having objects comprising one or more physical devices, logical devices, and/or data collections, each object associated with the user via one or more on-line relationships over one or more computer networks;
   automatically determining a plurality of objects from the objects of the connectivity universe of the user and an assessment of access proximity relative to the user for each such object, the access proximity for at least one of the determined plurality of objects being different for different users;

automatically grouping the determined plurality of objects into a plurality of groupings based upon the determined assessments of access proximity relative to the user, each grouping associated with a different class of access proximity; and displaying, in a unified view, a graphical representation of the automatically determined groupings and their respective objects.

9. The memory medium of claim 8 wherein the automatically determined plurality of objects comprise a plurality of devices.

10. The memory medium of claim 8 wherein the automatically determined plurality of objects comprise a plurality of data collections.

11. The memory medium of claim 8 wherein the determined assessment of access proximity is based upon at least one of physical proximity to the user, extent of control available to the user, type of object, and/or portion of object associated with the user.

12. The memory medium of claim 8, the displaying the graphical representation further comprising:

determining a layout of the plurality of groupings relative to the different classes of access proximity; and displaying a representation of the automatically determined grouping according to the determined layout.

13. The memory medium of claim 8, the displayed graphical representation further comprising displaying a plurality of proximity bands.

14. A computing system comprising:

a computer memory; and a display manager, stored in the computer memory, and that is configured, when executed, to:

determine a connectivity universe for a user, the connectivity universe having objects comprising one or more physical devices, logical devices, and/or data collections, each object associated with the user via one or more on-line relationships over one or more computer networks;

automatically determine a plurality of objects from the objects of the connectivity universe of the user and an assessment of access proximity relative to the user for each such object, the access proximity for at least one of the determined plurality of objects being different for different users;

automatically group the determined plurality of objects into a plurality of groupings based upon the determined assessments of access proximity relative to the user, each grouping associated with a different class of access proximity; and display, in a unified view, a graphical representation of the automatically determined groupings and their respective objects.

15. The system of claim 14 wherein the determined plurality of objects comprise a plurality of devices.

16. The system of claim 14 wherein the determined plurality of objects comprise a plurality of data collections.

17. The system of claim 14 wherein each class of access proximity is based upon at least one of physical proximity to the user, extent of control available to the user, type of object, and/or portion of object associated with the user.

18. The system of claim 14, the display manager further configured, when executed, to:

determine a layout of the proximity bands relative to the classes of access proximity; and display the proximity bands and the representation of the plurality of determined objects based upon the determined layout.

19. The system of claim 14 wherein the proximity bands comprise at least one proximity band that depicts at least one media collection of at least one type.

20. The system of claim 14, each automatically determined object associated with content, wherein the display manager is further configured, when executed, to:

receive an indication of a selected representation of an object; and display the content associated with the selected object.

21. The method of claim 1 wherein the determined assessment of access proximity of an object relative to the user is based upon ability of the user to control access rights of the user and/or of other users to the object.

22. The method of claim 1 wherein the determined assessment of access proximity of an object relative to the user is based upon control of the object by the user.

23. The method of claim 1 wherein the determined assessment of access proximity of an object relative to the user is based upon the type of object.

24. The method of claim 1 wherein the determined assessment of access proximity of an object relative to the user is based upon how much of the object is occupied by content associated with the user.

25. The method of claim 1 wherein the determined assessment of access proximity of an object relative to the user is based upon whether the object is a public service, virtual device, and/or controlled-access device.

26. The method of claim 1, the connectivity universe including a host computing system from which the user is viewing the connectivity universe, wherein the determined assessment of access proximity of an object relative to the user is based upon whether the object is the host computing system.

27. The method of claim 1 wherein the determined assessment of access proximity of an object relative to the user is based upon whether the object resides on a public shared network or a network dedicated to a controlled-access group.

28. The method of claim 1 wherein the determined assessment of access proximity of an object relative to the user is based upon whether the object is connected to the connectivity universe via a wireless connection.

29. The method of claim 1 wherein the determined assessment of access proximity of an object relative to the user is based upon at least one of physical proximity to the user, extent of control available to the user, type of object, and/or portion of object associated with the user and is also based upon operational characteristics and/or network connectivity characteristics.

30. The method of claim 1 wherein the displaying the graphical representation of the automatically determined groupings displays the groupings relative to a designated host device that is displayed as part of one of the determined groupings.

31. The method of claim 1, the displaying the graphical representation of the automatically determined groupings further comprising:

displaying an indication of each class of access proximity.

32. The method of claim 6, the displaying the plurality of proximity bands further comprising:

displaying a plurality of a proximity band associated with a host device, a proximity band associated with a network, a proximity band associated with a wireless device, a proximity band associated with shared data, a proximity band associated with internet services, and/or a proximity band associated with websites.

33. The method of claim 7 wherein the at least one type is at least one of photos, images, music, files, contacts, videos, email, instant messages, newsgroups, favorites, history, or web pages.

34. The method of claim 7, the displaying the at least one proximity band that depicts at least one media collection of at least one type, further comprising:
displaying at least one proximity band that depicts at least one media collection of at least one type, wherein the at least one media collection depicts sub-collections that reside on a plurality of different devices.

35. The method of claim 1, at least one of the groupings including an object that is a wireless device connected via one of the computer networks.

36. The method of claim 1 wherein the displaying, in a unified view, a graphical representation of the automatically determined groupings and their respective objects further comprises:
for each grouping, graphically indicating the associated access proximity of the grouping relative to the user and displaying representations of the objects included in the grouping, such that the displayed graphical representation visually communicates a relative measure of access proximity between the user and each grouping of objects.

37. The computer-readable medium of claim 8, at least one of the groupings including an object that is a wireless device connected via one of the computer networks.

38. The computer-readable medium of claim 8 wherein the method further comprises:
for each grouping, graphically indicating the associated access proximity of the grouping relative to the user and displaying representations of the objects included in the grouping, such that the displayed graphical representation visually communicates a relative measure of access proximity between the user and each grouping of objects.

39. The computer-readable medium of claim 8 wherein the medium is a computer memory of a computing system and the instructions are computer instructions.

40. The system of claim 14, at least one of the groupings including an object that is a wireless device connected via one of the computer networks.

41. The system of claim 14 wherein the display manager is further configured, when executed, to:
for each grouping, graphically indicate the associated access proximity of the grouping relative to the user and display representations of the objects included in the grouping, such that the displayed graphical representation visually communicates a relative measure of access proximity between the user and each grouping of objects.

* * * * *